United States Patent
Soeda et al.

(10) Patent No.: US 8,593,701 B2
(45) Date of Patent: Nov. 26, 2013

(54) OPTICAL SCANNING DEVICE AND IMAGE FORMING APPARATUS

(75) Inventors: Masahiro Soeda, Kanagawa (JP); Tadashi Nakamura, Tokyo (JP); Akira Kojima, Kanagawa (JP); Tomohiro Nakajima, Kanagawa (JP)

(73) Assignee: Ricoh Company, Ltd., Tokyo (JP)

( * ) Notice: Subject to any disclaimer, the term of this patent is extended or adjusted under 35 U.S.C. 154(b) by 402 days.

(21) Appl. No.: 12/871,114

(22) Filed: Aug. 30, 2010

(65) Prior Publication Data

US 2011/0058230 A1 Mar. 10, 2011

(30) Foreign Application Priority Data

Sep. 4, 2009 (JP) ................................. 2009-204939
Oct. 28, 2009 (JP) ................................. 2009-247629

(51) Int. Cl.
*H04N 1/00* (2006.01)
*H04N 1/024* (2006.01)
*G02B 26/08* (2006.01)

(52) U.S. Cl.
USPC ........ 358/474; 358/401; 358/473; 359/204.1; 359/204.2; 359/204.3; 359/205.1; 359/206.1; 359/207.1; 359/207.2; 359/207.3; 359/207.4; 359/207.5; 359/207.6

(58) Field of Classification Search
None
See application file for complete search history.

(56) References Cited

U.S. PATENT DOCUMENTS

| | | | |
|---|---|---|---|
| 4,853,710 A | 8/1989 | Shimada et al. | |
| 5,633,744 A | 5/1997 | Nakajima | |
| 5,753,907 A | 5/1998 | Nakajima et al. | |
| 5,786,594 A | 7/1998 | Ito et al. | |
| 5,793,408 A | 8/1998 | Nakajima | |
| 5,936,756 A | 8/1999 | Nakajima | |
| 5,999,345 A | 12/1999 | Nakajima et al. | |
| 6,052,211 A | 4/2000 | Nakajima | |
| 6,376,837 B1 | 4/2002 | Itabashi et al. | |
| 6,621,512 B2 | 9/2003 | Nakajima et al. | |
| 6,657,765 B2 | 12/2003 | Hayashi et al. | |
| 6,775,041 B1 | 8/2004 | Nakajima | |
| 6,788,444 B2 | 9/2004 | Suzuki | |
| 6,839,157 B2 | 1/2005 | Ono et al. | |

(Continued)

FOREIGN PATENT DOCUMENTS

JP 2924200 5/1999
JP 3011144 12/1999

(Continued)

*Primary Examiner* — Benny Q Tieu
*Assistant Examiner* — Haris Sabah
(74) *Attorney, Agent, or Firm* — Cooper & Dunham LLP

(57) ABSTRACT

An oscillating mirror module as a deflecting unit is disposed so that a movable mirror faces a plane where image carriers are arranged. A plurality of light source units are disposed within a plane parallel to the plane where the image carriers are arranged so that main light fluxes of light beams emitted from the light sources form predetermined angles with each other. The oscillating mirror module includes an incidence mirror that bends a plurality of light beams emitted from the light source units to direct the light beams to the movable mirror, and a separation mirror that separates the light beams scanned by the movable mirror into two opposite directions with respect to a cross-section including a surface normal of the movable mirror and perpendicular to the rotation axis of the movable mirror. A light collecting unit collects light beams so that output optical axes of the light beams corresponding to the light source units intersect on a surface of the movable mirror of the deflecting unit.

19 Claims, 17 Drawing Sheets

(56) References Cited

U.S. PATENT DOCUMENTS

| | | |
|---|---|---|
| 6,932,271 B2 | 8/2005 | Nakajima et al. |
| 6,933,959 B2 | 8/2005 | Kojima et al. |
| 6,972,883 B2 | 12/2005 | Fujii et al. |
| 6,995,885 B2 | 2/2006 | Nakajima |
| 7,068,296 B2 | 6/2006 | Hayashi et al. |
| 7,170,660 B2 | 1/2007 | Nakajima |
| 7,333,254 B2 | 2/2008 | Amada et al. |
| 7,411,712 B2 | 8/2008 | Nakajima et al. |
| 7,423,787 B2 | 9/2008 | Nakajima |
| 7,453,615 B2 | 11/2008 | Nakajima |
| 7,468,824 B2 | 12/2008 | Nakajima |
| 7,471,306 B2 | 12/2008 | Nakajima |
| 7,471,434 B2 | 12/2008 | Nakamura et al. |
| 7,495,813 B2 | 2/2009 | Akiyama et al. |
| 7,511,868 B2 | 3/2009 | Nakajima |
| 7,529,011 B2 | 5/2009 | Fujii |
| 7,532,227 B2 | 5/2009 | Nakajima et al. |
| 7,561,318 B2 | 7/2009 | Nakajima |
| 7,593,029 B2 | 9/2009 | Satoh et al. |
| 7,599,105 B2 | 10/2009 | Nakajima |
| 7,643,193 B2 | 1/2010 | Nakamura et al. |
| 7,684,100 B2 | 3/2010 | Amada |
| 7,697,180 B2 | 4/2010 | Nakajima |
| 7,710,445 B2 | 5/2010 | Amada et al. |
| 7,729,031 B2 | 6/2010 | Nakamura et al. |
| 7,760,227 B2 | 7/2010 | Nakajima |
| 7,764,301 B2 | 7/2010 | Suzuki et al. |
| 7,773,280 B2 | 8/2010 | Nakajima |
| 2002/0118428 A1 | 8/2002 | Ohno et al. |
| 2004/0047017 A1 | 3/2004 | Ohno et al. |
| 2005/0062836 A1 | 3/2005 | Nakajima |
| 2005/0190420 A1 | 9/2005 | Imai et al. |
| 2006/0158711 A1 | 7/2006 | Imai et al. |
| 2007/0058255 A1 | 3/2007 | Imai et al. |
| 2007/0146738 A1 | 6/2007 | Nakajima |
| 2007/0206259 A1 | 9/2007 | Nakajima |
| 2008/0192323 A1 | 8/2008 | Nakamura et al. |
| 2008/0204852 A1 | 8/2008 | Amada et al. |
| 2008/0212156 A1 | 9/2008 | Nakajima |
| 2008/0212999 A1 | 9/2008 | Masuda et al. |
| 2008/0218829 A1 | 9/2008 | Nakamura |
| 2008/0239433 A1 | 10/2008 | Amada et al. |
| 2009/0015897 A1 | 1/2009 | Nakamura et al. |
| 2009/0052944 A1 | 2/2009 | Kubo et al. |
| 2009/0073523 A1 | 3/2009 | Nakamura |
| 2009/0153933 A1 | 6/2009 | Tsuchiya et al. |
| 2009/0201358 A1 * | 8/2009 | Nakamura ............ 347/260 |
| 2009/0225148 A1 | 9/2009 | Itami et al. |
| 2009/0225383 A1 | 9/2009 | Soeda et al. |
| 2010/0091083 A1 | 4/2010 | Itami et al. |
| 2010/0091342 A1 | 4/2010 | Nakamura |
| 2010/0183337 A1 | 7/2010 | Kubo et al. |

FOREIGN PATENT DOCUMENTS

| | | |
|---|---|---|
| JP | 2001-281575 | 10/2001 |
| JP | 3445691 | 6/2003 |
| JP | 3543473 | 4/2004 |
| JP | 2007-233235 | 9/2007 |
| JP | 2008-102487 | 5/2008 |

* cited by examiner

FIG. 9
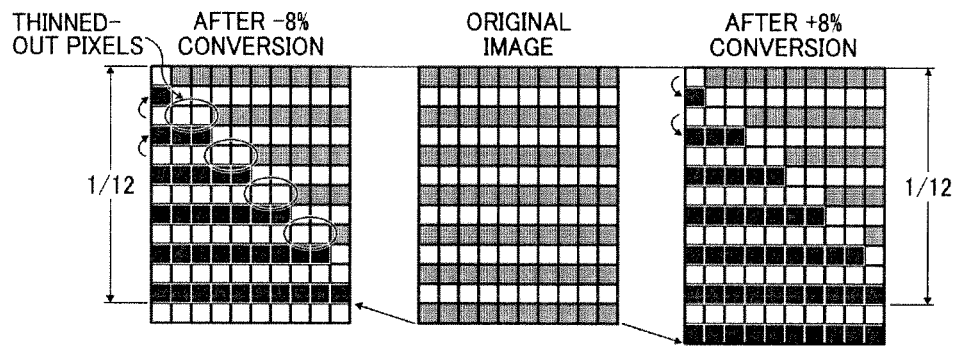
FIG. 10A FIG. 10B
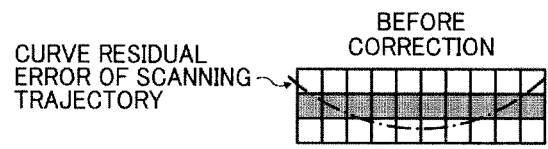
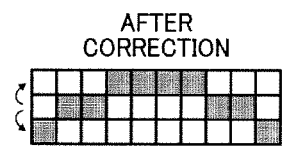
FIG. 11
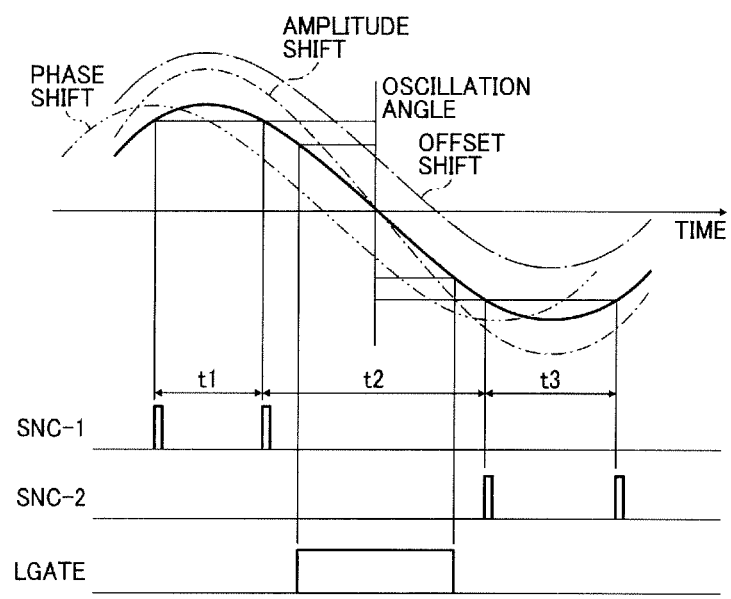

OPTICAL SCANNING DEVICE AND IMAGE FORMING APPARATUS

CROSS-REFERENCE TO RELATED APPLICATIONS

The present application claims priority to and incorporates by reference the entire contents of Japanese Patent Application No. 2009-204939 filed in Japan on Sep. 4, 2009 and Japanese Patent Application No. 2009-247629 filed in Japan on Oct. 28, 2009.

BACKGROUND OF THE INVENTION

1. Field of the Invention

The present invention relates to an optical scanning device and an image forming apparatus such as a copier, a printer, a facsimile, a plotter, or a multifunction printer provided with at least one of these, which includes the optical scanning device.

2. Description of the Related Art

A deflecting unit using silicon micromachining has been studied in recent years, and there is proposed a system in which an oscillating mirror and a torsion bar rotatably supporting the oscillating mirror are integrally formed on a Si substrate, as disclosed in Japanese Patent No. 2924200 and Japanese Patent No. 3011144.

Japanese Patent No. 3445691 and Japanese Patent No. 3543473 also disclose examples of arranging an oscillating mirror instead of a polygon mirror. According to this system, there are advantages that a size of a mirror surface can be made small and the system has low noise and low power consumption although a high-speed operation is possible because of reciprocating oscillation performed by using resonance. There are another advantages that because this system has low vibration and almost no heat generation, a housing for an optical scanning device can be made thin-walled and image quality is hardly affected by this system even if a high-grade resin molding material such as a material with a high combination ratio of glass fiber is not used.

Moreover, Japanese Patent Application Laid-open No. 2007-233235 discloses an example of applying an oscillating mirror to an optical scanning device of a tandem color type. This example describes that by setting a scanning frequency fd according to a resonance frequency of the oscillating mirror and adjusting a beam spot interval p according to the set scanning frequency, it is possible to form a high-quality image without uneven density, color shift, and color error.

In addition, Japanese Patent Application Laid-open No. 2001-281575 discloses an example of an optical scanning device provided with a separation unit that is disposed in the downstream of an optical deflector (polygon scanner). In the example, a plurality of light beams are separated into an array direction of photosensitive drums by the disposed separation unit after being deflected by the deflector and passing through a scanning lens.

As explained above, by using the oscillating mirror, in addition to the advantages of low noise, low power consumption, and low heat generation, there are another advantages that because of a flat configuration in which the oscillating mirror and the torsion bar rotatably supporting the oscillating mirror are formed integrally, the thickness of the oscillating mirror in its normal direction can be made thin as compared with the polygon scanner that has predetermined dimensions (radius of an inscribed circle) from its rotation axis to a mirror surface and that is provided with a rotor in order to ensure inertia.

However, as disclosed in Patent document 5, similarly to the system of using the conventional polygon scanner, the conventional technology employs a system that the rotation axis of the oscillating mirror is arranged so as to be perpendicular to a plane where scanning positions of the photosensitive drums are arranged. Therefore, advantages that the thickness of the oscillating mirror in the normal direction is thin cannot be made full use of.

Moreover, in order to cause the light beams corresponding to colors to obliquely enter the oscillating mirror at angles different from each other in a direction of a rotation axis of the oscillating mirror i.e. a sub-scanning direction, light source units need to be separately disposed in the sub-scanning direction in association with respective inclinations of output optical axes. Therefore, the thickness of the optical scanning device is increased in the direction perpendicular to the plane where the scanning positions of the photosensitive drums are arranged, and this configuration is thereby disadvantageous to lower the height of the device body.

Furthermore, there has been conventionally known an optical scanning device in which a light flux is deflected by a deflecting unit such as an optical deflector and the deflected light flux is imaged as a fine spot beam on a surface to be scanned, and the spot beam is scanned at a constant speed on the surface to be scanned along a main scanning direction. This optical scanning device is applied to a latent image writing unit or the like of an image forming apparatus such as a laser beam printer, a laser beam plotter, a facsimile, and a digital copier. The optical scanning device is configured in such a manner that a laser beam emitted from, for example, a laser light source is deflectively reflected by the optical deflector, so that the laser beam is scanned over the surface to be scanned of an image carrier or the like, and at the same time, by causing the laser beam to be modulated in intensity (e.g., on and off) according to an image signal, an image is written to the surface to be scanned.

Japanese Patent Application Laid-open No. 2001-281575 discloses the optical scanning device provided with the separation unit disposed in the downstream of the optical deflector. By disposing the separation unit and appropriately setting an arrangement position of bending mirrors, it is enabled to reduce a distance from the separation unit to a cylindrical mirror as a most downstream optical element of the optical scanning device.

Japanese Patent Application Laid-open No. 2008-102487 discloses a technology for an optical scanning device capable of forming a high-quality image by adjusting an incident position of a light beam on the optical deflection surface in the main scanning direction and making beam spot diameters uniform over the entire surface to be scanned.

In the abovementioned conventional technologies, however, firstly, a reflection direction of each light flux at the separation unit is set to a rotation axis direction of the polygon mirror. In this case, there is less space capable of accommodating an optical element on a side opposite to the polygon mirror, and the size of the optical scanning device is upsized in consideration of the size of actual bending mirrors and the space for a mechanism for adjusting these.

Secondly, an imaging unit needs to be provided between the optical deflector and the separation unit, which makes it difficult to reduce the distance from the optical deflector to the separation unit, and thus, there is a limit on miniaturization of the optical scanning device.

There is space, around the optical deflector, that can be secured without thickening the size of the entire optical scanning device (see a configuration of an optical scanning device 2000 in FIG. 30). Therefore, there is possibility to provide an optical scanning device suitable for a smaller size thereof. However, in the conventional optical scanning device of a one-side scanning system in which a plurality of light fluxes incident on a light deflector 2001 are deflected on the same surface of the optical deflector for scanning, a separation direction for the light fluxes is the rotation axis direction of the optical deflector, and thus, there is not much space on the side of the surface to be scanned in a writing housing, which causes a size (t') to be larger. In addition, when a reflection angle at a separation mirror is large, wavefront aberration of the light fluxes may be degraded because of low surface accuracy of the separation mirror.

SUMMARY OF THE INVENTION

It is an object of the present invention to at least partially solve the problems in the conventional technology.

According to an aspect of the present invention there is provided an optical scanning device including: a plurality of light source units modulated by image information for respective colors; a coupling unit that couples a light beam emitted from each of the plurality of light source units; a light collecting unit that collects the plurality of light beams coupled; a deflecting unit that includes a rotatably supported movable mirror and collectively scans the light beams emitted from the light source units; and a plurality of imaging units that images the light beams scanned by the deflecting unit on image carriers for the respective colors. The optical scanning device is configured to form a plurality of images for the respective colors and used in an image forming apparatus in which the image carriers for the respective colors are arranged within a same plane. The deflecting unit is disposed so that the movable mirror faces the plane where the image carriers are arranged. The plurality of light source units are disposed so that main light fluxes of the light beams emitted from the plurality of light source units form predetermined angles with each other in a plane parallel to the plane where the image carriers are arranged. The optical scanning device further includes: an incidence mirror that bends the light beams emitted from the plurality of light source units to the movable mirror; and a separation mirror that separates the plurality of light beams scanned by the movable mirror into two opposite directions with respect to a cross-section including a surface normal of the movable mirror and perpendicular to a rotation axis of the movable mirror. The light collecting unit collects the light beams so that output optical axes of the light beams corresponding to the light source units intersect at a surface of the movable mirror of the deflecting unit, for scanning the image carriers for the respective colors with the light beams.

According to another aspect of the present invention there is provided an optical scanning device including: a plurality of light sources that emits light fluxes scanning a plurality of surfaces to be scanned; an optical deflector that deflects the light fluxes emitted from the plurality of light sources on a same surface for scanning; a separation unit that separates the plurality of light fluxes into a first set of light fluxes and a second set of light fluxes; and an imaging unit that images the light fluxes deflected for scanning by the optical deflector. All the light fluxes separated by the separation unit are reflected so as to come close to a plane that is parallel to directions, in which the light fluxes are scanned on the surfaces to be scanned, and includes a rotation axis of the optical deflector.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 9 is an explanatory diagram of a magnification-deviation preventing function;

FIGS. 10A and 10B are explanatory diagrams of how to correct curve residual error of a scanning trajectory;

FIG. 11 is an explanatory diagram representing changes in oscillation angles of a movable mirror;

DETAILED DESCRIPTION OF THE PREFERRED EMBODIMENTS

Exemplary embodiments of the present invention will be explained below.

First Embodiment

Figure 1:
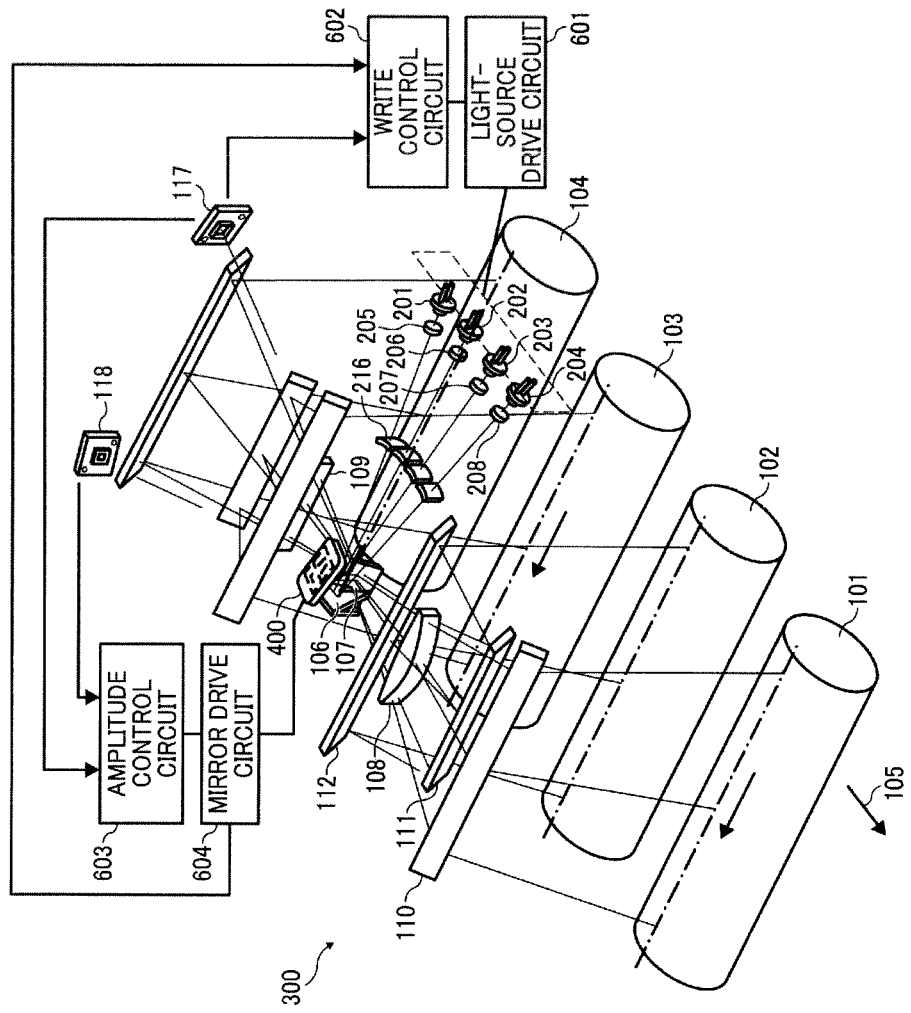
FIG. 1 is a perspective view of a configuration of an optical scanning device according to a first embodiment.
Figure 2:
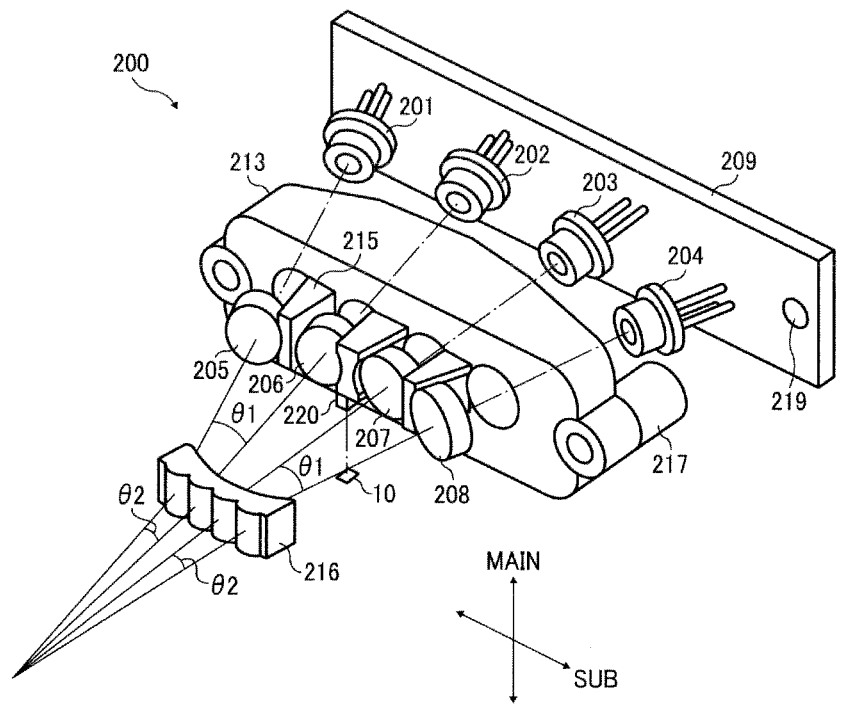
FIG. 2 is a perspective view of a configuration of a light source module in FIG. 1.
Figure 3:
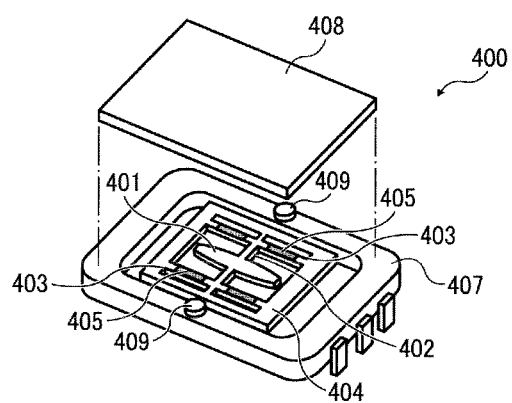
FIG. 3 is a perspective view of a configuration of an oscillating mirror module.

FIG. 1 represents a configuration of an optical scanning device that scans four stations by a single oscillating mirror. FIG. 2 is a perspective view of a configuration of a light source module 200. FIG. 3 represents a configuration of an oscillating mirror module 400 as a deflecting unit. The present embodiment represents an example of using the oscillating mirror that generates rotational torque by a piezoelectric actuation system as a deflecting unit.

In FIG. 1 and FIG. 2, reference numerals 101 to 104 represent photosensitive drums; 105: a movement direction of a transfer body; 106: an incidence mirror; 107: a separation mirror; 108 and 109: scanning lenses; 110 to 112: bending mirrors; 201 to 204: semiconductor lasers; 205 to 208: coupling lenses; 216: a cylindrical lens; 117: a synchronization detection sensor; 118: a termination detection sensor; 300: an optical scanning device; 601: a light-source drive circuit; 602: a write control circuit; 603: an amplitude control circuit; and 604: a mirror drive circuit.

As shown in FIG. 1, the optical scanning device 300 that scans photosensitive drums is integrally configured. A plurality of light beams are emitted from the light sources corresponding to the four photosensitive drums 101, 102, 103, and 104 that are equally spaced along the movement direction 105 of the transfer body and form images of yellow, magenta, cyan, and black thereon, respectively. The light beams emitted from the light sources are made incident on a surface of the movable mirror within a cross-section inclined at a predetermined angle with respect to a plane, which includes a surface normal of a movable mirror in the oscillating mirror module 400 and is parallel to the rotation axis, about a rotation axis of the movable mirror, at different angles with respect to the surface normal, and are guided to the photosensitive drums after being deflected, so that images are simultaneously recorded in a plurality of image forming stations.

The scanning positions on the surfaces of the photosensitive drums for respective colors are designed to be substantially located on the same plane, and the rotation axis of the movable mirror is arranged so as to be parallel to this plane and be perpendicular to photosensitive drum axes.

Output optical axes of lights emitted from the light source module that includes the semiconductor lasers 201, 202, 203, and 204 as corresponding light source units and the coupling lenses 205, 206, 207, and 208 as coupling units are arranged separated from each other by a predetermined angle so as to be incident at different angles in the direction of the rotation axis of the movable mirror in a plane parallel to the plane where the scanning positions are arranged.

As shown in FIG. 2, the semiconductor lasers 201, 202, 203, and 204 for the respective colors are radially arranged in a resin support member 213 so that the output optical axes intersect one another at nearly the same point, and are integrally supported thereby while relative positions are maintained.

The support member 213 is formed symmetrically with respect to a cross-section that includes the surface normal of the movable mirror 401 and is perpendicular to the rotation axis thereof, and array directions of 2-channel beam spots on the surfaces of the respective photosensitive drums are aligned between the stations.

As for the semiconductor lasers, cylindrical peripheral portions of respective can packages are press-fitted into engagement holes (not shown) formed along the output optical axes from the backside of the support member 213, and the corresponding coupling lenses 205, 206, 207, and 208 are fixed to protrusions 215 that are protruded from the support member 213 and have U-shaped fixing surfaces with an adhesive filled in each gap between the protrusion 215 and each edge of the coupling lenses.

A light-source drive circuit for semiconductor lasers is formed on a printed board 209 and is shared by the semiconductor lasers. The printed board 209 is screwed into supports 217 formed in the support member 213, and lead terminals are soldered so that circuit connection is established.

In the present embodiment, each of the semiconductor lasers for each color has one channel, and thus light-source drive circuits for four channels are formed.

In order to support high-speed writing, a plurality of lines can be simultaneously written with a multi-beam semiconductor laser having two or more channels may be employed to enable simultaneous writing in a plurality of lines. For example, when each of multi-beam semiconductor lasers has two channels, light-source drive circuits for eight channels are formed.

A light source module 200 is screwed into a bearing surface provided in a housing through fixing holes 219 at both ends of the printed board 209 while engaging a protrusion 220 protruding from the bottom face of the light source module 200 into a square hole 10 of the housing to position a center position of the array of the semiconductor lasers.

A contact surface of the fixing hole 219 with the bearing surface of the housing is formed vertically with respect to the plane where the output optical axes of the multi-beam semiconductor lasers are arranged, and is supported vertically with respect to the rotation axis of the movable mirror 401.

The light beams emitted from the multi-beam semiconductor lasers 201, 202, 203, and 204 pass through the cylindrical lens 216 as a light collecting unit having refracting power in the rotation axis direction of the movable mirror 401, are converged in the same direction, and are imaged to form a line shaped image on the surface of the movable mirror 401.

In the present embodiment, lens portions through which the light beams emitted from the multi-beam semiconductor lasers 201, 202, 203, and 204 pass are integrally formed to each other with resin. A cylindrical surface is formed on a second surface of the lens portions and a first surface thereof is formed so as not to be parallel to the planes perpendicular to the output optical axes. The incident light beams are thereby bent in the plane where the output optical axes are arranged, and thus, respective light beams emitted from the multi-beam semiconductor lasers 201 and 202 and from the multi-beam semiconductor lasers 203 and 204 are output from the cylindrical lens 216 so that an angle θ2 between output light beams is smaller than an angle θ1 between the light beams entering the cylindrical lens 216.

This enables the incidence angle difference, in the rotation axis direction of the movable mirror 401, between the multi-beam semiconductor lasers incident on the movable mirror 401 to be more acute. Thereby, the semiconductor lasers and the coupling lenses can be arranged such that an optical path length from the movable mirror 401 as the deflecting unit to the semiconductor laser as the light source unit can be made shorter than ever before and the light beams can be bent so as to sufficiently separate the light beams from each other.

Moreover, curving a scanning trajectory or degradation of the beam spots due to optical aberration occurring together with oblique incidence can be reduced.

It should be noted that by forming the cylindrical surface on the first surface of the cylindrical lens and forming the second surface thereof so as not to be parallel to the planes perpendicular to the output optical axes, the incident light beams can be bent more largely within the plane where the output optical axes are arranged.

In a configuration in which the light beams are bent by the collimate lenses 205, by making a first surface non-parallel to the planes perpendicular to the output optical axes and forming a collimate surface on a second surface, the light beams can be bent, and thus, separated from each other more largely.

A positioning unit for determining a positional relationship with the support member 213 may be formed in the cylindrical lens 216 as a light collecting unit, so that the support member 213 and the cylindrical lens 216 is fixed integrally.

As a method for generating rotational torque, there are known electromagnetic actuation and electrostatic actuation in addition to piezoelectric actuation, and the same effect is obtained even if any one of them is used.

As shown in FIG. 3, the oscillating mirror module 400 includes the movable mirror 401 having a mirror surface on its surface and forming an oscillator, a torsion bar 402 for supporting the movable mirror 401 and forming the rotation axis, a cantilever 403 for generating rotational torque in the torsion bar, and a frame 404 formed as a support portion thereof. The oscillating mirror module 400 is formed by being cut-out from an Si substrate through etching. In addition, as shown in FIG. 3, reference numeral 405 represents PZT films; 407: a ceramic package; 408: a glass window; and 409: a protrusion.

A width of the torsion bar 402 is 40 to 60 micrometers, and cantilevers 403 are symmetrically formed about the rotation axis and connects four corners of the torsion bar 402 the frame 404, and the PZT films 405 is formed on the surface of the cantilevers 403.

The PZT films 405, when being alternately applied with positive and negative voltages, expand and contract to deflect the cantilever 403 to generate rotational torque in and thus twist the torsion bar 402 to cause the movable mirror 401 to oscillate back and forth.

By making a switching period of the voltage close to an eigen frequency of a primary oscillation mode of the oscillator when the torsion bar acts as the rotation axis, i.e., close to a resonance frequency f0, an amplitude is excited, and a large oscillation angle can thereby be obtained.

In the present embodiment, the oscillation angle is ±25°, and an incident light beam is scanned at a maximum of ±50°.

Generally, the scanning frequency fd is set so as to match the resonance frequency f0 or is controlled so as to follow the resonance frequency f0. However, because the resonance frequency f0 depends on inertial moment I of the oscillating movable mirror 401, if there is a manufacturing variation in a finished dimension of a width of the torsion bar 402 or the like due to cutting-out by etching, a difference may occur between individual pieces, and thus, it is difficult to make uniform the scanning frequencies fd of individual oscillating mirror modules.

Here, the resonance frequency f0 is a characteristic value specific to the oscillating mirror module, and therefore, it is described separately from a scanning frequency fd that can be set or selected step by step in a mirror drive circuit using clock division.

The variation in the resonance frequency f0 may occur at about ±100 Hz depending on performance of etching process. For example, if a scanning frequency fd=2 kHz as a target, when a deviation of 0.5% in scanning pitch corresponding to one line per 20 lines occurs, the deviation in the scanning pitch is accumulated at the end of an image, which results in a change (magnification deviation) of even several millimeters (e.g., 1.5 millimeters) in the width of the image in a sub-scanning direction.

Therefore, in the present embodiment, as shown in FIG. 9, the magnification deviation is prevented to occur by performing, in a write control circuit, explained later, inserting or thinning out to image data between lines according to the resonance frequency f0 of the oscillating mirror module 400 installed in the device.

The action thereof will be explained below.

In FIG. 9, for simplicity in explanation, the number of main-scanning dots corresponding to one line is set to 10 dots.

For example, if a deviation in a scanning frequency fd corresponding to one line per 12 lines occurs, i.e. a magnification deviation of 8% occurs, $$Ns=1/\eta=1/0.08=12$$

$$k=Nm/(Ns/2-1)=10 \text{ dots}/5=2 \text{ dots}$$

where η is a magnification deviation and Nm is the number of main-scanning dots.

In other words, by shifting an objective pixel to an adjacent line while increasing the number of pixels by two dots every two lines, the magnification deviation can be corrected.

In this manner, if the resonance frequency f0 is high or if the magnification is desired to be increased, deployed original image data is converted such that pixel data is shifted to a backward adjacent line. Conversely, if the resonance frequency f0 is low or if the magnification is desired to be reduced, deployed original image data is converted such that pixel data is shifted to a frontward adjacent line, so that expanded original image data is converted so as to thin out adjacent pixels to be shifted.

Generally, because the number of main-scanning dots Nm becomes 600 dpi and even 4960 dots at an A4 width, if a magnification of 5% is desired to be shifted, $$Ns=1/\eta=1/0.05=20$$

$$k=Nm/(Ns/2-1)=4960 \text{ dots}/9=551 \text{ dots, and}$$

if a magnification of 0.5% is desired to be shifted, $$Ns=1/\eta=1/0.005=200$$

$$k=Nm/(Ns/2-1)=4960 \text{ dots}/99=50 \text{ dots,}$$

and, therefore, it is possible to deal with these cases by increasing objective pixels to be shifted at one time with an increase in magnification deviation.

Meanwhile, previously-known curve residual error of the scanning trajectory that occurs together with oblique incidence of light beams on the movable mirror 401 can be made less noticeable on the image, as shown in FIGS. 10A and 10B, similarly to the above, by shifting the pixel data to a positional relationship opposite to the curve residual error.

In the write control circuit 602, these processes are ANDed so that the original image data is converted and is stored in a frame memory. The data is read as line-by-line raster data and the line-by-line raster data is transferred to the light-source drive circuit 601 using a synchronization detection signal as a trigger. The light-source drive circuit 601 modulates the semiconductor laser based on the raster data.

The present embodiment includes the synchronization detection sensor 117 and the termination detection sensor 118, so that an amplitude of the oscillating mirror module 400 can be detected. Therefore, the mirror drive circuit 604, upon its start up, gradually sweeps the scanning frequency fd to determines a value of the scanning frequency fd closest to the resonance frequency f0, which causes maximum amplitude, based on these detection signals, and sets the determined value as the scanning frequency fd to be used.

Moreover, the write control circuit 602 determines the number of pixels to be inserted or thinned out so that magnification deviation becomes a minimum, according to the deviation of the set scanning frequency fd from a center value based on these detection signals.

In addition, the light-source drive circuit 601 varies a reference clock fh, which is used to modulates the light source, according to the set scanning frequency fd so that a ratio of the reference clock fh to "scanning frequency fd/number of channels in the light source" is maintained constant.

Figure 13:
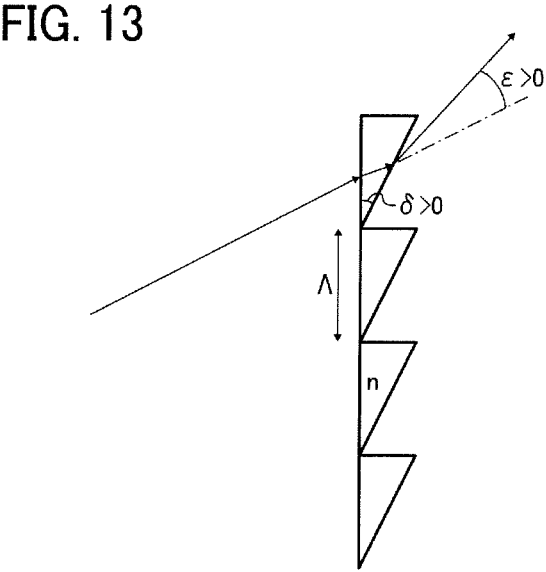
FIG. 13 is a schematic diagram of a diffraction lens to bend a light beam passing through the light collecting unit.

FIG. 13 represents a schematic diagram of a diffraction lens to bend a light beam passing through the light collecting unit.

In FIG. 13, the following relational expression holds under small-angle approximation, where n is a refractive index, $\delta$ is a vertex angle, $\Lambda$ is a length of a grating, and $\epsilon$ is a deflection angle (angle between an incident light and an emitted light):

$\epsilon = (n-1) \cdot \delta$

By forming a diffraction grating into a shape according to a desired angle of bend, a plurality of light beams can be appropriately separated from each other.

By forming the diffraction grating on the surface of the diffraction lens through photolithography technique, a type in which a path difference is provided caused by irregularities, a type in which a path difference is provided caused by a difference in refractive indexes, and a type (pleated diffraction grating) in which a fixed path difference (phase difference) is provided in a saw-tooth cross-section, or the like is often used.

Figure 7:
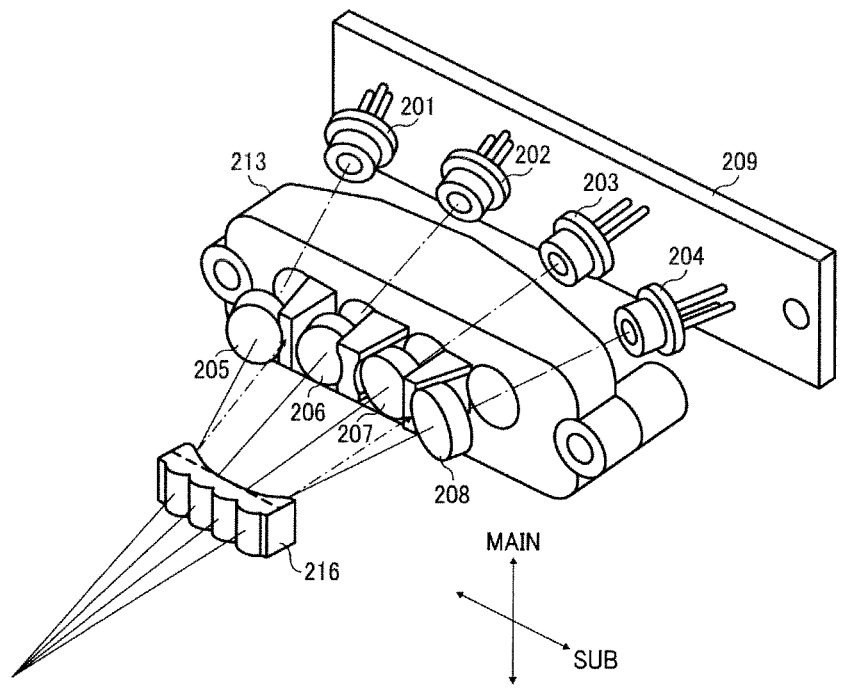
FIG. 7 is a perspective view for explaining a function of a light collecting unit in which separation action due to refracting power is not provided therein.

In FIG. 7, the first surface of the cylindrical lens of the cylindrical lens 216 when separation action due to refractive power is not provided in the light collecting unit is indicated by dotted line. In this case, surfaces through which the light beams pass inside and outside are the same, and the light beams at both ends cannot be separated in the sub-scanning direction as shown by dashed one-dotted line, and thus a collimate lens and a semiconductor laser that form the light source unit cannot be appropriately arranged.

Moreover, in order to sufficiently separate the light beams from each other, the light source units need to be disposed at positions apart from the deflecting unit by an increased distance, which causes the device to enlarge, and the light intensity of the semiconductor laser passing through the optical system for writing and being imaged on an image carrier is thereby getting weaker with an increase in the optical path length, thus being difficult to form a sharp latent image.

Furthermore, when an incidence-angle difference between the semiconductor lasers is increased to ensure a sufficient space where the semiconductor lasers can be arranged, this leads to, as a negative effect due to the difference between oblique incidence angles of the light beams, degradation of the curve in the scanning trajectory or degradation of the shape of beam spot due to aberration as optical characteristics. Thus, a characteristic difference between the light beams is made significant, which causes latent images formed on the image carriers to be different between the stations and causes deterioration of a formed image such as a color shift.

Figure 8:
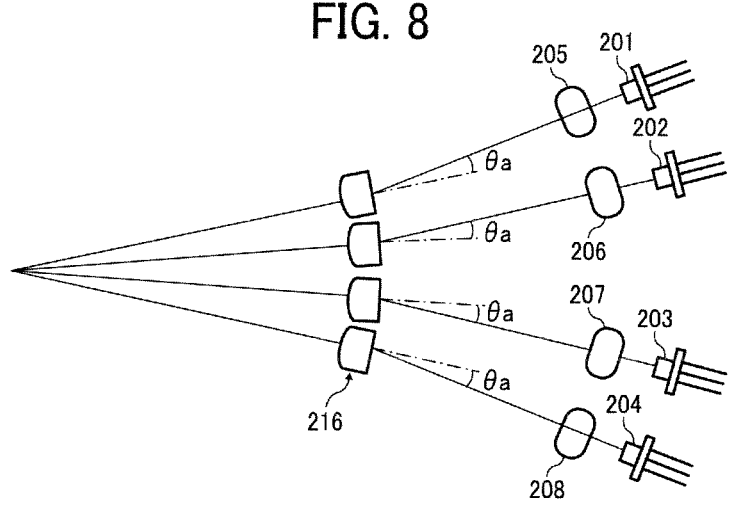
FIG. 8 is a plan view of an example in which all of a plurality of light beams bend at a same angle.

FIG. 8 represents an implementation example when all the light beams are bent at the same angle.

Because the light beams are bent at the same angle $\theta a$ (each angle formed by an output optical axis of the each light beam output from the cylindrical lens and its incidence axis), the coupling lenses and the cylindrical lens, fixtures for these lenses, and the light source units and fixing units thereof can be designed in the same structure between the stations, which allows reduction in manufacturing costs and assembly costs.

Moreover, because imaging elements of the same design can be used, design time can be reduced, and a variation in optical characteristics of beam spots due to a difference in profiles of optical elements between the stations does not occur, and thus the beam spots become more uniform.

Even if all the angles cannot be made the same as one another, by configuring an adjacent pair to bend corresponding light beams to the same angle, this allows sharing of the optical elements, reduction in the design time, cost reduction due to sharing of the components, and simplified adjustment of the characteristics between the light beams.

Figure 5:
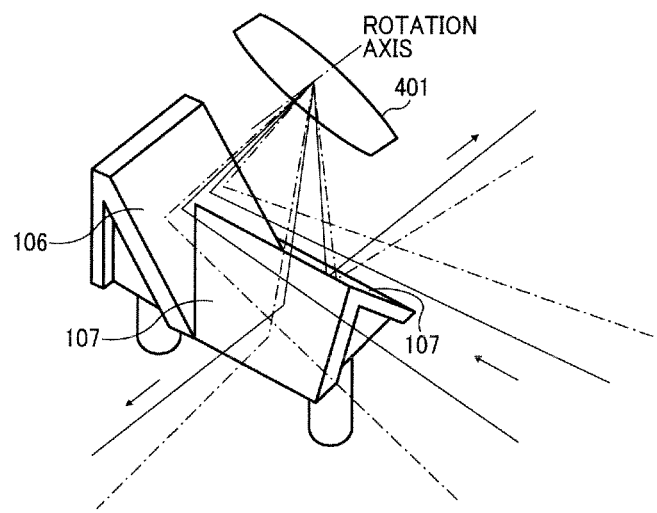
FIG. 5 is a perspective view representing a relationship among an incidence mirror, a movable mirror, and a separation mirror.

As shown in FIG. 5, the light beams output from the cylindrical lens 216 are caused to enter the movable mirror 401 by an incidence mirror 106 having a reflective surface parallel to the rotation axis of the movable mirror 401 so as to gather in a plane including an axis inclined relative to the surface normal of the movable mirror 401 at a predetermined angle around the rotation axis of the movable mirror 401.

At this time, the light beams emitted from the semiconductor lasers 201, 202, 203, and 204 are made to enter the movable mirror surface in directions in which the light beams converge to each other symmetrically about the cross-section including the surface normal and perpendicular to the rotation axis of the movable mirror 401, intersect on the movable mirror surface, and then, are reflected in directions in which the light beams separate from each other.

The light beams reflected by the surface of the movable mirror 401 are reflected so that a set of the light beams emitted from the multi-beam semiconductor lasers 201 and 202 and another set of the light beams emitted from the multi-beam semiconductor lasers 203 and 204 are separated into two opposite directions by the separation mirror 107 provided directly after the movable mirror 401 and having a pair of reflective surfaces which are formed into a roof shape of which ridge line is located in a cross-section perpendicular to the rotation axis, and each of the reflective surfaces being inclined at a predetermined angle from the cross-section.

Figure 4:
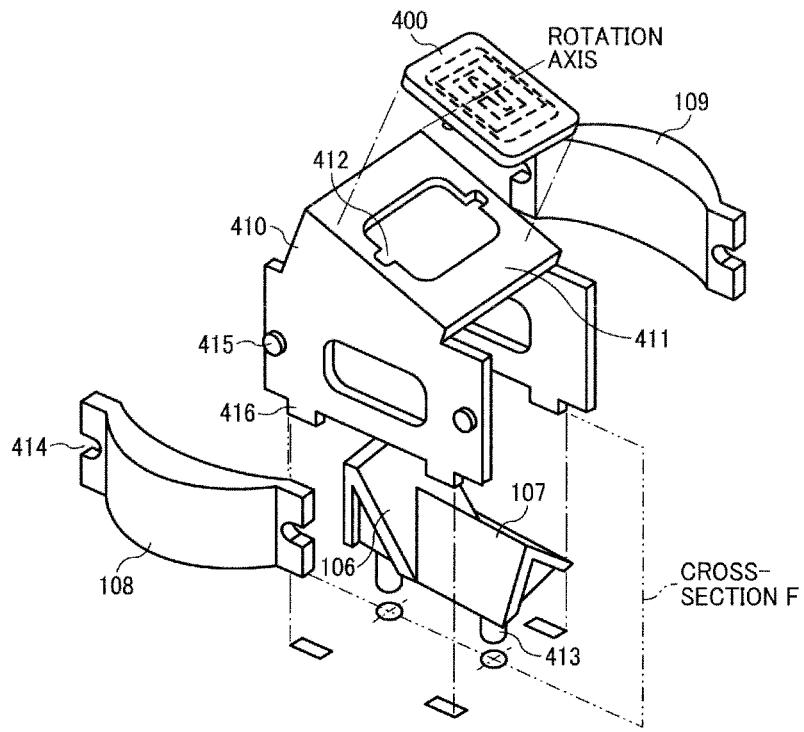
FIG. 4 is an exploded perspective view of a configuration of supporting the oscillating mirror module to a housing.

FIG. 4 represents a support portion of the oscillating mirror module 400 to a housing (not shown).

Referring to FIG. 3 and FIG. 4, the oscillating mirror module 400 is configured such that a movable mirror portion formed of the Si substrate is packaged in the ceramic package 407 having lead terminals and sealed while reducing the pressure inside of the glass window 408. The oscillating mirror module 400 is mounted so that the surface of the movable mirror 401 is directed downward.

Provided in the ceramic package 407 is a pair of protrusions 409 arranged on the extension of the rotation axis of the movable mirror 401, the surface of the package is abutted against a mounting surface 411 inclined at a predetermined angle with respect to the bottom face of a support member 410 formed into a U shape to engage the protrusions 409 into a groove 412, and thereby positioning of the direction of the rotation about the surface normal of the movable mirror 401 as an axis is performed. Thus, the positioning is performed between the optical axes of the incidence mirror 106, the separation mirror 107, and the scanning lenses 108 and 109 explained later, and the center of the oscillation of the movable mirror 401.

In the present embodiment, the scanning lenses 108 and 109 are positioned by engaging grooves 414 provided in flash portions at both ends of the scanning lenses with protrusions 415, so that the scanning lenses 108 and 109 are connected to the side faces of the support member 410 to be formed integrally with the support member 410.

The support member 410 with the oscillating mirror module 400 and the scanning lenses 108 and 109 mounted thereon is mounted on the housing such that four protrusions 416 protruded from a bottom face of the support member 410 is engaged into square holes in the housing and thereby the arrangement of the incidence mirror 106, the separation mirror 107, and the light source module 200 is adjusted.

The incidence mirror 106 and the separation mirror 107 are integrally molded with resin and are mounted on the housing in such a manner that the bottom face thereof formed in parallel to the plane where the output optical axes of the multi-beam semiconductor lasers are arranged is in contact with a bearing surface of the housing, a pair of positioning pins 413 protruded from the bottom face is engaged into round holes of the housing, and thereby positioning on the bearing surface of the housing is performed so that the ridge line of the separation mirror 107 and a cross-section F perpendicular to the rotation axis of the movable mirror 401 are aligned with each other.

This configuration allows accurate positioning of relative arrangement between the light source module 200 and the incidence mirror 106, the separation mirror 107, the movable mirror 401, and the scanning lenses 108 and 109, and allows mounting thereof on the housing.

FIG. 11 represents an overview of changes in oscillation angle of the movable mirror over time.

Because the movable mirror 401 is resonantly oscillated, an oscillation angle θ changes in the form of a sin wave with time t. Therefore, $$\theta = \theta_0 \cdot \sin 2\pi fd \cdot t$$

where θ0 is a maximum oscillation angle of the movable mirror or an amplitude, and fd is a scanning frequency. The scanning lenses 108 and 109 are designed so that a moving speed of a beam spot along the surface of the photosensitive drum is constant with respect to a change dθ/dt of the oscillation angle.

The light beam emitted from the semiconductor laser 201 is separated by the separation mirror 107 and then passes through the scanning lens 108, and records a black image on the photosensitive drum 101 via the bending mirror 110.

The light beam emitted from the semiconductor laser 202 is separated by the separation mirror 107 and then passes through the scanning lens 108, and records a cyan image on the photosensitive drum 102 as the image carrier via the bending mirrors 111 and 112.

Also, in the residual stations being symmetric with respect to the plane perpendicular to the rotation axis of the movable mirror 401, the laser beams are separated by the separation mirror 107 in the direction opposite to the abovementioned other stations, and then pass through the scanning lens 109, to record a yellow image and a magenta image on the photosensitive drums 104 and 103, respectively.

The synchronization detection sensor 117 and the termination detection sensor 118 detect, at outside a scan area, the light beam emitted from the multi-beam semiconductor laser 204 that forms a yellow image, generate synchronization detection signals for synchronizing timings of writing images in the stations, and detect an amplitude of the movable mirror 401, and a phase and an offset of the amplitude.

In the present embodiment, settings are as follows: an amplitude θ0=25°; a detected scan angle of the synchronization detection sensor 117 and the termination detection sensor 118 θs=18°; and a scan angle corresponding to an image area (LGATE) θd=15°, and by calculating times t1, t2, and t3 based on detection signals of the sensors, the amplitude is controlled.

For example, if there is a shift in the amplitude θ0, a scanning speed along the surface of the photosensitive drum changes, and a width of an image in the main scanning direction thereby is changed. If there is a phase shift or an offset shift, a deviation in a write position or a local magnification change in the scanning direction may occur, which causes color shift or uneven density.

When each of the sensors detects a beam whose scan angle corresponds to 2θs, the detection signals are generated in backward scanning and forward scanning. When a time difference t1 between the detection signals at backward scanning and forward scanning in the synchronization detection sensor is used, θs is expressed as follows:

$$\theta s = \theta_0 \cdot \cos 2\pi fd \cdot t1/2$$

and θs is fixed, and thus, it is understood that by measuring t1, the amplitude θ0 can be detected.

Likewise, by detecting t2 and t3 by additionally using the termination detection sensor, a phase shift in a time-axis direction and an offset shift of the center of the amplitude can be detected.

Therefore, by controlling a gain applied to the oscillating mirror module 400 and timing of the reference clock, a deviation from an initial value is corrected, and a stable amplitude can thereby be always maintained.

Figure 6:
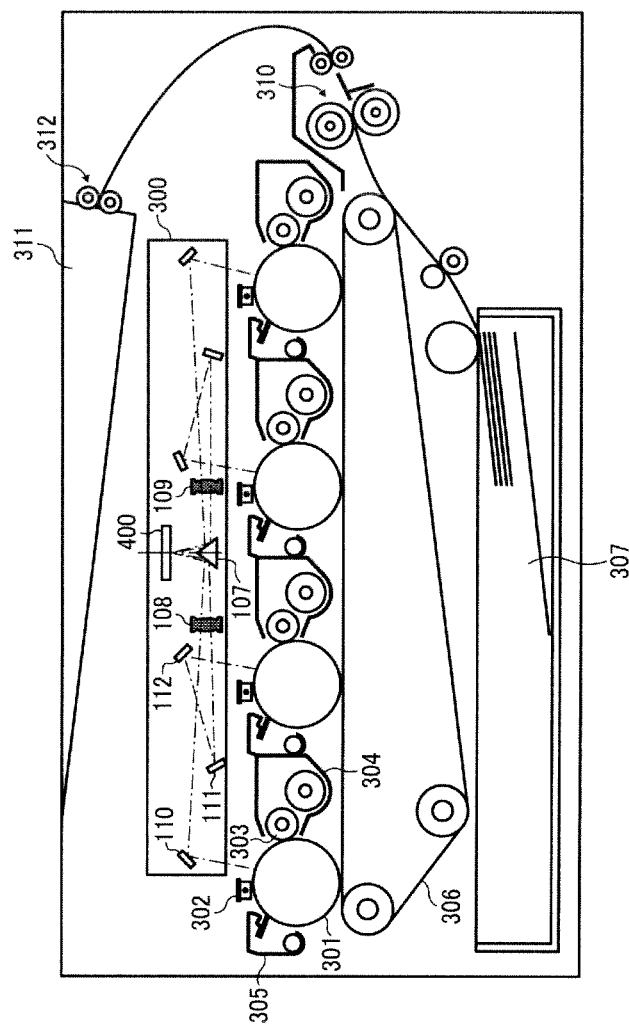
FIG. 6 is an explanatory diagram of a schematic configuration of an image forming apparatus provided with the optical scanning device according to the first embodiment.

FIG. 6 represents an example of an image forming apparatus provided with the optical scanning device 300 including the oscillating mirror module 400.

Arranged around a photosensitive drum 301 are a charging charger 302 for charging a photosensitive element to a high voltage, a developing roller 303 for causing charged toner to adhere to an electrostatic latent image recorded by the optical scanning device 300 and visualizes the image, a toner cartridge 304 for supplying toner to the developing roller, and a cleaning case 305 for scraping off toner remaining on the drum and stores the toner therein. The image forming stations have basically the same configuration as one another except for toner colors.

The movable mirror 401 is driven at a predetermined scanning frequency, the light source is modulated according to image data for each of the colors read so as to be synchronized with the image writing timing, and an image is recorded one line each in one period of the movable mirror 401.

The image forming stations for yellow, magenta, cyan, and black are arranged along a movement direction of a transfer belt 306, toner images formed on the photosensitive drums are sequentially transferred (primary transfer) to the transfer belt at timings matched so that toner images are superimposed on one another on the transfer belt, to form toner images with mixed yellow, magenta, cyan, and black.

The toner images superimposed on the transfer belt are transferred (secondary transfer) to a recording paper fed from a paper feed tray 307 at a matched timing.

The recording paper with the toner images transferred thereto is fixed in a fixing device 310, and is ejected to a discharge tray 311 by a discharging roller pair 312.

Figure 12:
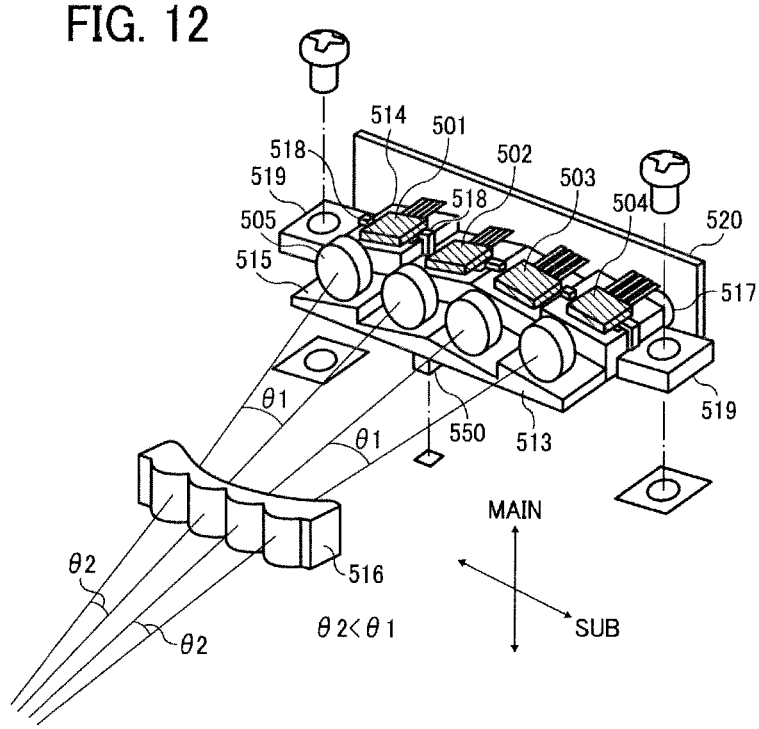
FIG. 12 is a perspective view of another implementation example of the light source module.

FIG. 12 represents another implementation example of the light source module.

This is an example of using a multi-beam semiconductor laser for the semiconductor laser as a light source.

Figure 14:
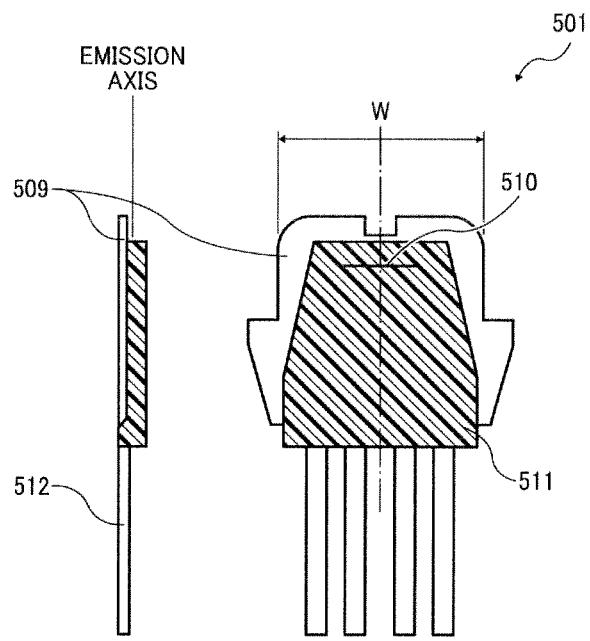
FIG. 14 is an explanatory diagram of a configuration of a multi-beam semiconductor laser.

An external appearance of a multi-beam semiconductor laser 501 as a light source is shown in FIG. 14. A light source chip 510 is mounted on a joint plane parallel to an active layer in a lead frame (not shown), and is covered with a resin cover 511. In the implementation example, a plurality (two channels) of light-emitting sources are monolithically formed and are arranged in a plane parallel to a lead frame 509. The light beams emitted from the light-emitting sources are emitted in parallel to the lead frame 509. Even if multi-beam semiconductor lasers have more than two channels, the configuration is the same as explained above except that a number of lead terminals is increased depending on the number of light sources.

Lead terminals 512 are extended from the lead frame 509, are connected to the respective light-emitting sources by wire bonding, and can thereby be driven independently.

As shown in FIG. 12, the light source module integrally supports multi-beam semiconductor lasers 501, 502, 503, and 504 for the respective colors.

The multi-beam semiconductor laser 501 are fixed such that the bottom surface of the lead frame 509 is in contact with a mounting surface 514 formed on a resin support member 513 the lead frame 509 is fitted in between protrusions 518 disposed upright so as to hold the lead frame 509 therebetween, and thus the direction of the output optical axes are positioned. A relative arrangement of the light-emitting sources is thereby maintained.

Incidentally, a magnification of an entire system in the sub-scanning direction of an imaging optical system that forms the optical scanning device is 1.5 to 2 times. If a pitch in the sub-scanning direction between adjacent beam spots by light beams emitted from the light-emitting sources is adjusted to a scanning pitch corresponding to 600 dpi, the scanning pitch is 42.4 micrometers. Therefore, assuming that an adjacent interval of the light-emitting sources is 50 micrometers, an array angle y becomes approximately as follows.

$$y = \sin^{-1}(42.4/1.5 \text{ to } 2/50) = 34.4° \text{ to } 25.1°$$

Figure 15:
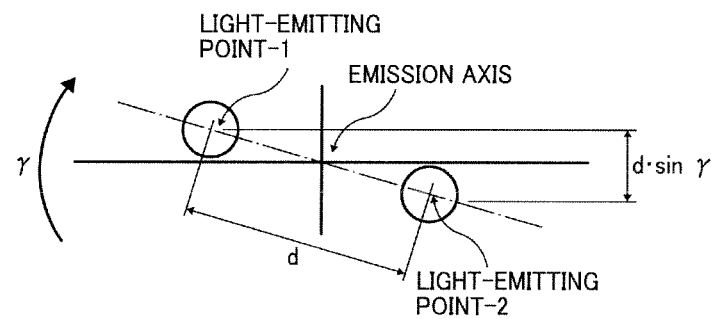
FIG. 15 is a schematic diagram representing an inclined state of the multi-beam semiconductor laser when it is mounted at an angle using its output optical axis as a rotation axis.

That is, to obtain a predetermined scanning line pitch on the surface of the photosensitive drum, as shown in FIG. 15, the multi-beam semiconductor laser 501 needs to be mounted at an angle abut the output optical axis as a rotation axis, and thus, the mounting surface 514 is formed at an angle beforehand.

As shown in FIG. 12, a coupling lens 505 is fixed to a fixing surface 515 with an adhesive filled in a gap between an edge of the coupling lens 505 and the fixing surface 515, and the fixing surface 515 is formed at an angle similarly to the mounting surface 514.

The support member 513 is formed symmetrically with respect to a cross-section including the surface normal and perpendicular to the rotation axis of the movable mirror 401 and thus directions, to which the multi-beam semiconductor lasers 501, 502, 503, and 504 are inclined, symmetric to each other. Thereby, arrangement directions of the 2-channel beam spots on the surfaces of the photosensitive drums are aligned between the stations. The multi-beam semiconductor lasers are radially arranged so that their output optical axes intersect at nearly the same point, and are integrally supported by the support member 513 while keeping their relative positions.

A light-source drive circuit of a multi-beam semiconductor laser is formed on a printed board 520, and is shared by a plurality of multi-beam semiconductor lasers. The printed board 520 is screwed into support posts 517 formed in the support member 513, and the lead terminals 512 are soldered so that circuit connection is established. In the implementation example, each of the multi-beam semiconductor lasers for the respective colors has two channels, and thus light-source drive circuits for eight channels are formed.

A light source module 500 is screwed into a bearing surface provided in the housing at flange portions 519 on both ends of the light source module 500, while engaging a protrusion 550 protruding from the bottom face of the light source module 500 into a square hole of the housing to position a center position of the array of the semiconductor lasers.

The contact surfaces of the flange portions 519 with the bearing surface of the housing are formed in parallel to the plane where the output optical axes of the multi-beam semiconductor lasers are arranged, and are supported in parallel to the rotation axis of the movable mirror 401.

The light beams emitted from the multi-beam semiconductor lasers 501, 502, 503, and 504 pass through a cylindrical lens 516 having refracting power in the rotation axis direction of the movable mirror 401, are converged in the same direction, and are imaged in a line-shaped image on the surface of the movable mirror 401.

In the implementation example, lens portions through which the light beams emitted from the multi-beam semiconductor lasers 501, 502, 503, and 504 pass are integrally formed with resin. A cylindrical surface is formed on a second surface thereof and a first surface thereof is formed so as not to be parallel to the planes perpendicular to the output optical axes. The incident light beams are thereby bent in the plane where the output optical axes are arranged, and thus, each light beams emitted from the multi-beam semiconductor lasers 501 and 502 and from the multi-beam semiconductor lasers 503 and 504 are output from the cylindrical lens 516 so that an angle $\theta 2$ between output light beams is smaller than an angle $\theta 1$ between the light beams entering the cylindrical lens 516.

This enables the incidence angle difference, in the rotation axis direction of the movable mirror 401, between the multi-beam semiconductor lasers incident on the movable mirror 401 to be more acute, and enables curve of scanning trajectory or degradation of beam spots due to optical aberration in association with oblique incidence to be reduced.

The multi-beam semiconductor lasers 501, 502, 503, and 504 for the respective colors are radially arranged on the resin support member 513 so that their output optical axes intersect at nearly the same point, and are integrally supported thereby while keeping their relative positions.

Second Embodiment

Second Embodiment (1)

Figure 16:
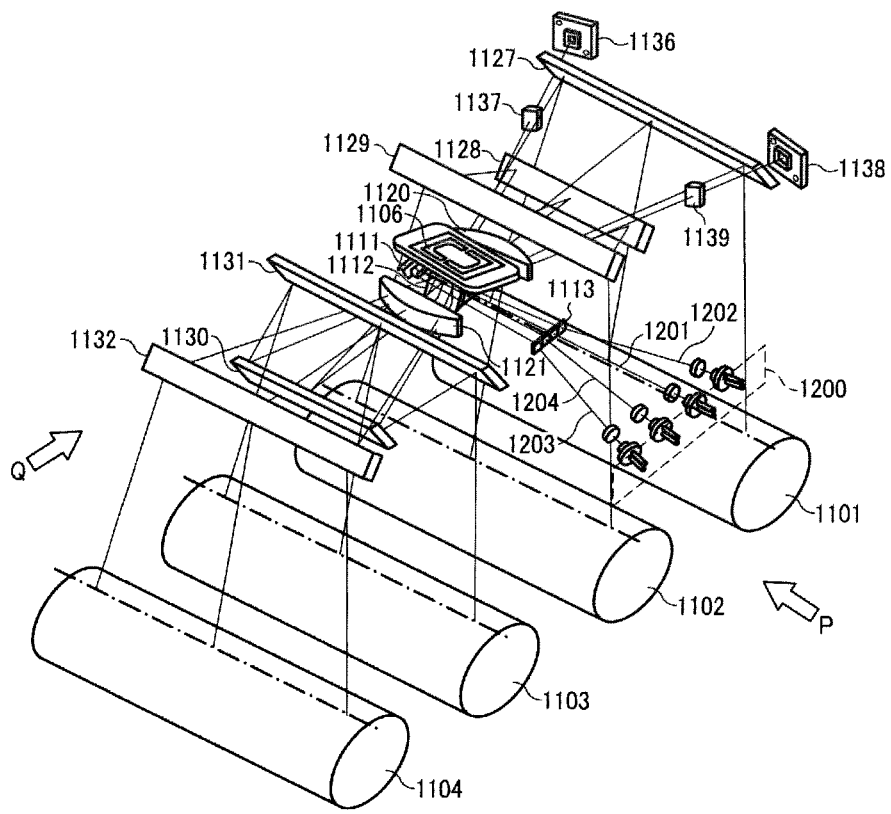
FIG. 16 is a perspective view of a configuration of an optical scanning device according to a second embodiment (1)
Figure 17:
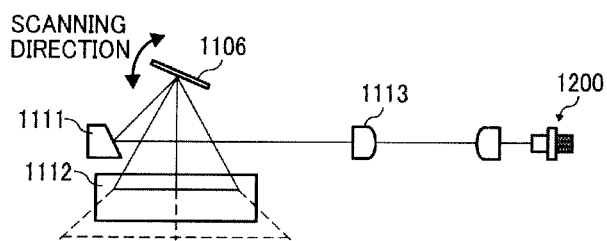
FIG. 17 is an optical path diagram of an optical path from a light source unit to a separation mirror in FIG. 16.
Figure 18:
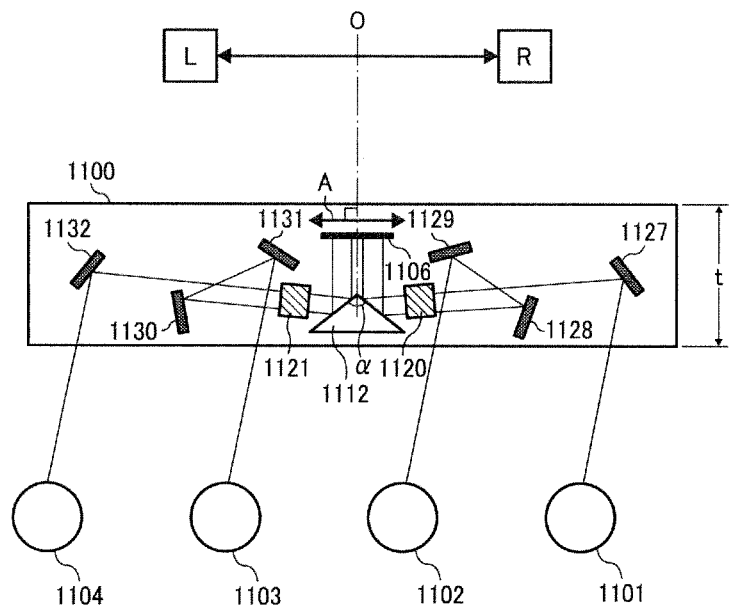
FIG. 18 is an optical path diagram representing the downstream of the deflector in FIG. 16.

FIG. 16 is a perspective view of an optical scanning device that scans four stations by using a micromirror using a resonance phenomenon for the optical deflector. An optical path diagram of an optical path from a light source unit to a separation mirror 1112 viewed from an observation point Q in FIG. 16 is shown in FIG. 17, while an optical path diagram representing the downstream of the deflector and viewed from an observation point P in FIG. 16 is shown in FIG. 18. Terms "upstream and downstream" mentioned here indicate an earlier point and a later point in the optical path along which beams 1201 to 1204 pass from their emission from light sources to reaching photosensitive drums 1101 to 1104, respectively.

As shown in FIG. 16, the optical scanning device for scanning the photosensitive drums is configured integrally. Beams emitted from light sources corresponding to the four photosensitive drums 1101, 1102, 1103, and 1104 arranged at an equal space along a movement direction of a transfer element 1105 are deflected in the main scanning direction by a micromirror 1106 and again separated to be guided to the four photosensitive drums 1101, 1102, 1103, and 1104, each of which rotates in the sub-scanning direction so that a two-dimensional image is formed.

The beams emitted from the light source units are collectively deflected by a single face of the micromirror 1106 for scanning. By scanning a plurality of scan areas by the one micromirror 1106, cost reduction is achieved, and there is no need to match resonance frequencies, drive frequencies, amplitudes, and oscillation angles, which are required when a plurality of micromirrors are used, and this allows reduction in manufacturing processes and improvement of optical performance. Moreover, separation of beams is facilitated and the entire device can be made small.

The beams are converged by a cylindrical lens group 1113 in the sub-scanning direction near the reflective surface of the micromirror 1106, and are guided to the micromirror 1106 by an incidence mirror 1111. After the beams are deflected by the micromirror 1106, the deflected beams are separated by the separation mirror 1112. Here, layout is provided so that four beams are separated in such a manner that two beams out of the four beams are directed to one side (R in FIG. 18) and the other two beams are directed to the other side (L in FIG. 18) with respect to a plane (O in FIG. 18) perpendicular to the rotation axis (A in FIG. 18) of the micromirror 1106. At this time, for the direction (O direction in FIG. 18) perpendicular to the rotation axis of the micromirror 1106, all the beams 1201 to 1204 are deflected by being reflected by the separation mirror 1112 so as to come close to the micromirror 1106 or to come close to a plane that is parallel to directions in which light fluxes are scanned along surfaces to be scanned of the respective photosensitive drums and that includes the rotation axis of the micromirror 1106.

Figure 30:
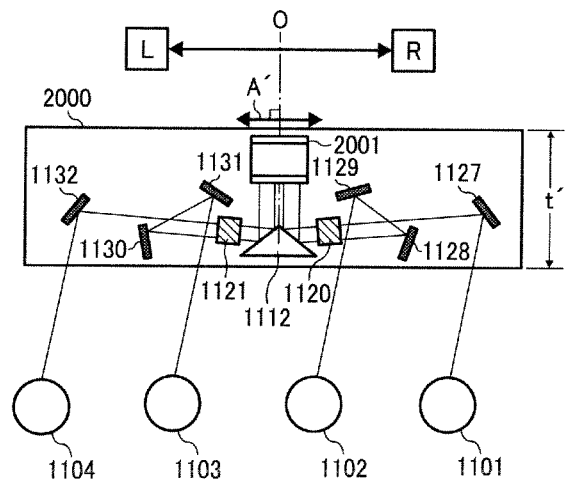
FIG. 30 is an optical path diagram representing the downstream of the deflector in the conventional optical scanning device.

Inside the optical scanning device, in a direction of a thickness t, an available space is wider in a side of the micromirror 1106 than in a side of the photosensitive drums 1101 to 1104, because the available free space in the side of the micromirror 1106 has a width corresponding to a distance from the micromirror 1106 to the separation mirror 1112 in the direction of the thickness t. Therefore, the layout provided in this manner allows reduction in the thickness t of the optical scanning device (which is shorter than a thickness t' in FIG. 30 indicating the conventional technology). In addition, by separating the beams in the downstream of the micromirror 1106 without passing the beams through the imaging unit, the thickness t is made further shorter, thus achieving the optical scanning device suitable for small sized ones.

The beams 1201 to 1204 that are emitted from the light source units and are deflected by the micromirror 1106 for scanning are imaged as spots on the photosensitive drums 1101 to 1104 via bending mirrors 1127 to 1132 and scanning lenses 1120 and 1121, to form latent images thereon based on image information, respectively. To keep a constant speed to scan the photosensitive drum over the entire area of an effective image area, the scanning lenses 1120 and 1121 are caused to have an f·arcsin characteristic.

In FIG. 16, the light beam deflected by the micromirror 1106 is configured to be collected by imaging lenses 1137 and 1139 and be incident on synchronization detection sensors 1136 and 1138, where synchronization detection signals are generated for each station based on each detection signal. This signal is also used for controlling an amplitude of the micromirror 1106, and thus, even if the resonance frequency and the amplitude fluctuate with time, by controlling a driving voltage or the like, the amplitude can be kept constant, the scanning speed within the effective image area is made constant, and image formation can be stably performed.

In the present embodiment, as the imaging lenses 1137 and 1139, anamorphic lenses whose curvature in the main scanning direction is different from curvature in the sub-scanning direction are used, so that the beams are focused on the synchronization detection sensors 1136 and 1138 in both the main scanning direction and the sub-scanning direction. However, in view of a function for generating a horizontal synchronization detection signal, an image is not necessarily formed in the sub-scanning direction. Therefore, to give priority to restriction such as the layout, a configuration that an image is not formed in the sub-scanning direction may be used instead.

Separation of Light

Figure 27A:
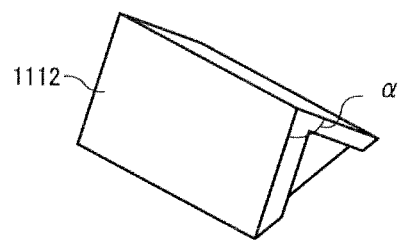
FIGS. 27A to 27C are explanatory diagrams representing configuration examples of a separation mirror formed into a triangular prism.
Figure 27B:
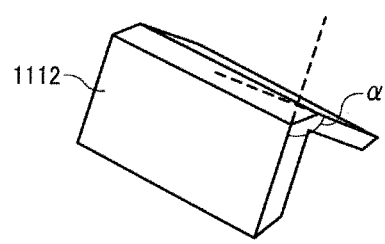
Figure 27C:
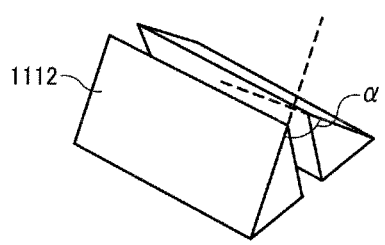

In the present embodiment, in order to realize the layout as explained so far, it is set so that an angle ($\alpha$ in FIG. 18), pointing towards the optical deflector, of a corner formed by the two reflective surfaces of the separation mirror 1112 is obtuse. In FIG. 18, the separation mirror 1112 is formed into a triangular prism, and $\alpha$ is a vertex angle formed by its reflective surfaces. However, the shape of the separation mirror 1112 is not necessarily the triangular prism, and thus, any shape may be adopted if its function can be performed. FIG. 27A represents a separation mirror formed into a triangular prism as shown in FIG. 18. If an effective area is not necessary to be large, the shape as shown in FIG. 27B, in which there is no vertex angle, may be adopted. As shown in FIG. 27C, if tolerance in arrangement accuracy or the like is not restricted so much, the separation mirror is not necessary to be formed as a monolithic element depending on the result of cost comparison for manufacture. In addition, as the shape of the separation mirror 1112, variously modified shapes can be thought of. In any one of the shapes, the angle, pointing towards the optical deflector, of the corner formed by the two reflective surfaces of the separation mirror 1112 is made obtuse, and thus, the beams after the separation are deflected by being reflected so that the beams come close to the micromirror 1106.

A relationship among scanning planes of the beams 1201 to 1204 will be explained below.

Figure 19:
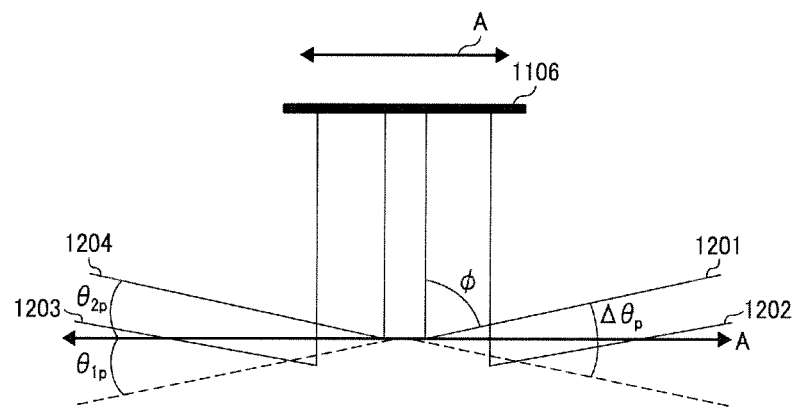
FIG. 19 is an explanatory diagram representing beams separated by the separation mirror according to the second embodiment.

FIG. 19 represents how the beams are deflected by the micromirror 1106 for scanning and are separated by the separation mirror 1112 in FIG. 18. Here, to avoid the figure from becoming complicated, the separation mirror 1112 is omitted, and only the way that the beams 1201 to 1204 are reflected by the separation mirror 1112 is shown therein.

Each plane on which each of the beams 1201 to 1204 travels right after being reflected by the separation mirror 1112 is defined as a scanning plane. In the present embodiment, the scanning planes of the beam 1201 and beam 1202 are set to be parallel to each other, and the scanning planes of the beam 1203 and beam 1204 are set to be parallel to each other. Each angle (acute angle side), formed by the respective scanning planes, in the sub-scanning direction perpendicular to the scanning direction is defined as follows.

An angle formed by the scanning planes of the beams 1201 and 1202 and the scanning planes of the beams 1203 and 1204: $\Delta\theta_p$ An angle formed by the scanning planes of the beams 1201 and 1202 and the rotation axis direction of the micromirror 1106: $\theta_{1p}$ Each angle formed by the scanning planes of the beams 1203 and 1204 and the rotation axis direction of the micromirror 1106: $\theta_{2p}$ The present embodiment is configured so that a first expression as follows is satisfied.

$$\Delta\theta_p = \theta_{1p} + \theta_{2p}$$

If this condition is not satisfied, the deflection by the separation mirror 1112 becomes extremely acute, and thus the thickness t of the optical scanning device becomes large. This is no good because, in order to reduce the thickness t in this case, more bending mirrors are required, or an optical path length is shortened if optical paths for four stations are to be realized by using the same number of bending mirrors 1127 to 1132. Therefore, according to the layout in which the first expression is satisfied, an arrangement of light beams is made easier, and flexibility of the layout is thereby increased. The number of bending mirrors can be reduced to the minimum, and the optical path length can be set appropriately for the optical characteristics.

Figure 20:
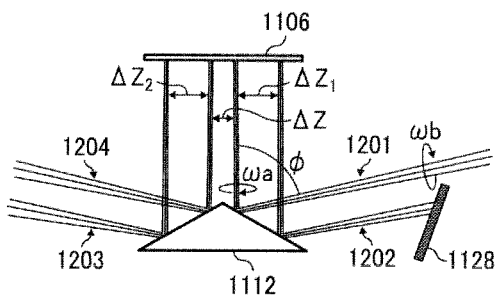
FIG. 20 is a schematic diagram of simultaneously representing a light flux diameter according to the second embodiment.

FIG. 20 is a schematic diagram of simultaneously representing a light flux diameter which is omitted in FIG. 19. For simplicity, the scanning lenses 1120 and 1121 or the like are omitted, and only the bending mirror 1128 is schematically shown for explanation.

As for the beams 1201 to 1204, each angle formed by an incident light on the separation mirror 1112 and a reflected light therefrom is represented as $\phi$ in FIG. 20. All the beams before the separation are parallel to each other, and because of the separation layout described above, an angle formed by an incident light and a reflected light of all the beams becomes $\phi$. In the present embodiment, a separation angle is set so that the $\phi$ for all the beams becomes acute. Increase of sensitivity of degradation in the optical characteristics such as degradation in wavefront aberration caused by surface accuracy of the separation mirror 1112 is not preferable. In this regard, setting of $\phi$ to be acute as in the present embodiment achieves the optical scanning device capable of making small the light flux diameter ($\cong \omega a/\cos(\phi/2)$) on the separation mirror 1112, reducing the sensitivity of degradation in the optical characteristics caused by tolerance of the separation mirror, and providing stable performance.

Figure 29A:
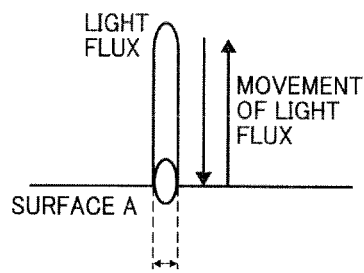
FIGS. 29A and 29B represent views for explaining that the size, at a surface A, of a light flux vertically incident on the surface is smaller than the size, at the surface A, of a light flux obliquely incident on the surface A.
Figure 29B:
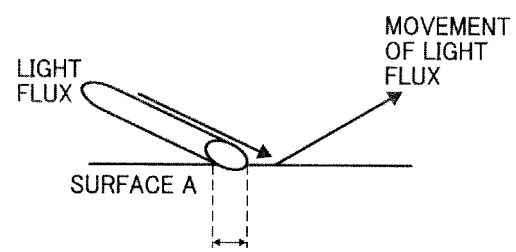

FIGS. 29A and 29B represent views for explaining that the size of a light flux vertically incident on a surface (surface A) at the surface A is smaller than the size of a light flux, at the surface A, obliquely incident on the surface A. The diameter of the light flux, at the surface A, obliquely incident thereon (FIG. 29B) is larger as compared with that of the vertically incident light flux (FIG. 29A). If the light flux diameter is large, this light flux is easily affected by the surface accuracy. Therefore, setting of $\phi$ to be acute is preferable.

As shown in FIG. 20, in the rotation axis direction of the micromirror 1106, a distance between the beam 1201 and the beam 1202 after being reflected by the micromirror 1106 is set as $\Delta Z_1$, a distance between the beam 1203 and the beam 1204 after being reflected by the micromirror 1106 is set as $\Delta Z_2$, and a distance between the beam 1201 and the beam 1204 after being reflected by the micromirror 1106 is set as $\Delta Z$. These distances are required for enabling separation of the beams 1201 to 1204. The distances are set so that the following conditions (second expression) hold.

$$\Delta Z < \Delta Z_1$$

$$\Delta Z < \Delta Z_2$$

These conditions are required because of the following reasons.

As explained above, when the beams are separated into one side (R side in FIG. 18) and the other side (L side in FIG. 18), a light flux diameter near the separation mirror is set as $\omega a$. A light flux diameter near the bending mirror 1128 in one of the both sides, for example, when the beam 1201 and the beam 1202 are separated is set as $\omega b$. Here, by the action of focusing in the sub-scanning direction (rotation axis direction of the micromirror 1106) on the micromirror 1106 by the cylindrical lens 1113 in a pre-deflector optical system, the light flux diameter after the beam is deflected by the micromirror 1106 is getting wider. Therefore, the light flux diameters are $\omega a < \omega b$. Because the beams are parallel to each other, separation of the beams is more difficult if it is performed at a location more downstream in the optical path. As for the separation of the beams 1201 to 1204, separation of a pair of the beams 1201 and 1202 and a pair of the beams 1203 and 1204 by the separation mirror 1112 are performed at a location more upstream side than the separation of the beam 1201 and beam 1202 or the separation of the beam 1203 and beam 1204 by the bending mirrors 1128 and 1130. Therefore, the separation at the separation mirror 1112 is easier than the other, and $\Delta Z$ is allowed to be a smaller value than values of $\Delta Z_1$ and $\Delta Z_2$.

Pre-Deflector Optical System

In order to set the distances between the beams 1201 to 1204 to obtain the above-mentioned relationship, the pre-deflector optical system is set as follows.

Figure 28A:
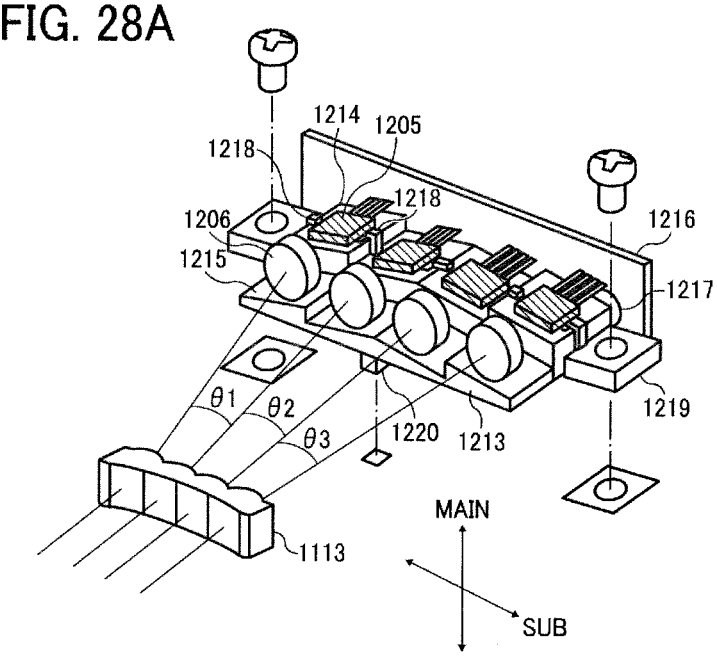
FIGS. 28A and 28B are perspective views of a configuration up to a cylindrical lens group in a pre-deflector optical system.
Figure 28B:
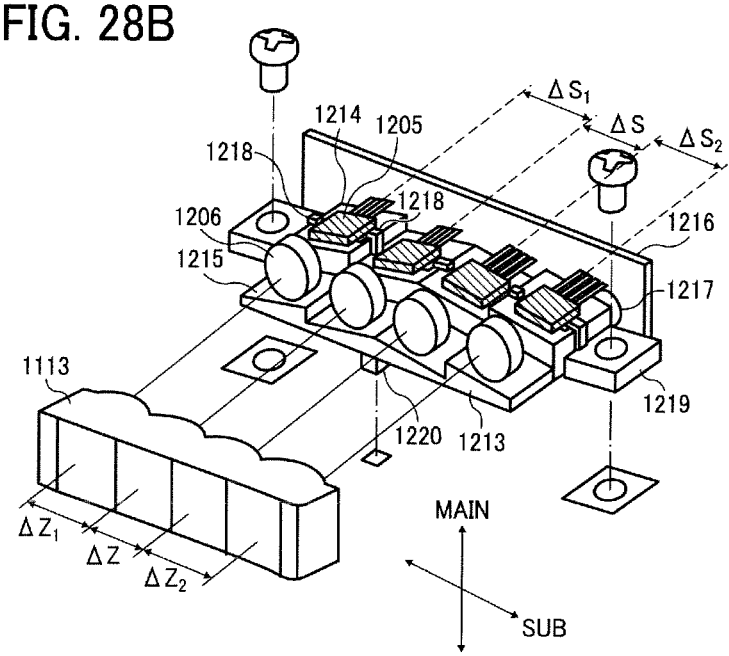

FIGS. 28A and 28B are perspective views of a portion up to the cylindrical lens group 1113 in the pre-deflector optical system.

In the present embodiment, for the sub-scanning direction in FIGS. 28A and 28B, all the light fluxes are guided to the incidence mirror and the optical deflector so as to be parallel to each other. Therefore, as shown in FIG. 28A, the beams are emitted at angles respectively to a direction which is the sub-scanning direction, and are made parallel to one another at the cylindrical lens group 1113. As shown in FIG. 28B, if it is permitted in view of the interference in the light source units, beam emission directions from the light sources may be set so as to be parallel to one another. In addition, various modifications can be made. For example, cylindrical lenses may be not integrally molded, and the beams may be deflected by coupling lenses 1206 in the sub-scanning direction in FIG. 28B.

In FIG. 28B, because the beams emitted from the light sources are parallel to one another, to satisfy the second expression, distances $\Delta S_1$, $\Delta S_2$, and $\Delta S$ between light-emitting points of the light sources are set so that the following conditions (third expression) hold.

$$\Delta S < \Delta S_1$$

$$\Delta S < \Delta S_2$$

Here, adjustment of arrangement is made so that a direction of light emitted from each of light-emitting points 1205 coincides with an optical axis of the coupling lens 1206 (which, because an incident plane is made flat, extends in a normal direction of the flat, and is an axis passing a vertex of a rotationally symmetric aspheric surface of an output plane). At this time, $\Delta S_1$ is equal to $\Delta Z_1$, $\Delta S_2$ is equal to $\Delta Z_2$, and $\Delta S$ is equal to $\Delta Z$. However, these values are not necessarily equal to each other depending on the layout or the like and it is enough that the second expression and the third expression are satisfied.

Scanning Lens

Figure 21A:
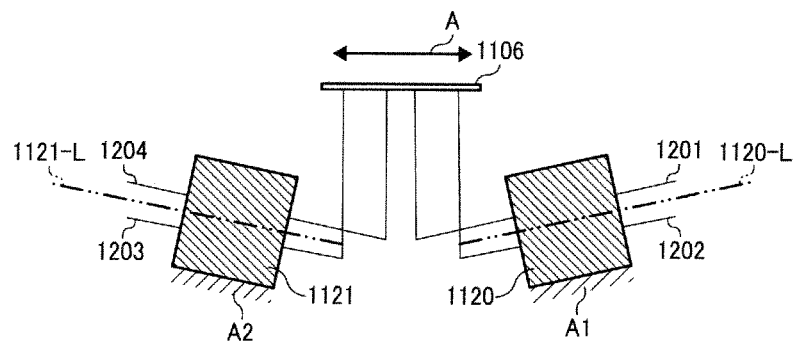
FIGS. 21A and 21B are explanatory diagrams of scanning lenses and light beams according to the second embodiment.

FIG. 21A represents the scanning lenses 1120 and 1121 and the beams 1201 to 1204. As explained above, the beams 1201 and 1202 are parallel, and the scanning lens is disposed so that the direction of the beams 1201 and 1202 and an optical axis 1120-L of the scanning lens 1120 are made parallel to each other. As for an optical plane of the scanning lens 1120, both the incident plane and the output plane are formed in shapes expressed by two-dimensional polynomials, and an axis connecting original points of the two-dimensional polynomials is set as an optical axis.

By setting the optical axis in this manner, an incidence angle of light on the scanning lens in the sub-scanning direction can be set to almost zero, which allows reduction in curve of a scanning line and degradation in wavefront aberration that may occur when the beam is made to obliquely enter the scanning lens, to thereby obtain stable optical characteristics. The sub-scanning direction mentioned here indicates a direction perpendicular to a direction (main scanning direction) in which scanning by reflection by the micromirror 1106 is performed. In FIG. 21A, the sub-scanning direction is transformed to the rotation axis direction of the micromirror 1106 (direction of A) at the upstream of the separation mirror (not shown), and is transformed to a nearly vertical direction on the plane of paper at the downstream of the separation mirror.

Figure 21B:
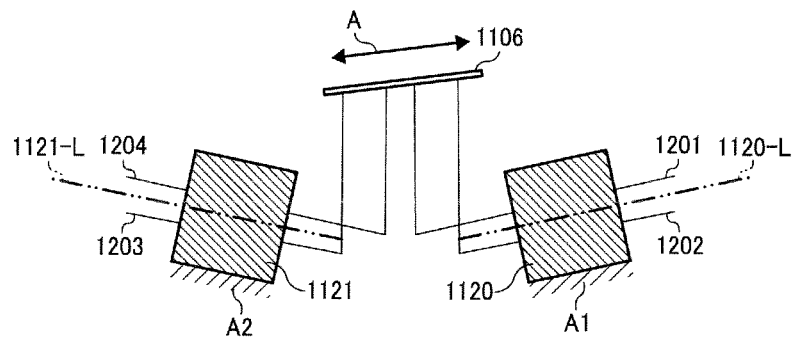

The scanning lenses 1120 and 1121 have reference planes A1 and A2, respectively. Here, the reference planes A1 and A2 are arranged at an angle with respect to the rotation axis direction A of the micromirror 1106. A minimum required configuration to obtain the effect of the present invention requires such an arrangement that either one of the reference plane A1 or the reference plane A2 is inclined with respect to the rotation axis direction A of the micromirror 1106. A modification is shown in FIG. 21B. An arrangement is such that the rotation axis A of the micromirror 1106 is parallel to the scanning lens 1120-L and is inclined with respect to a scanning lens 1121-L.

Second Embodiment (2)

Figure 22:
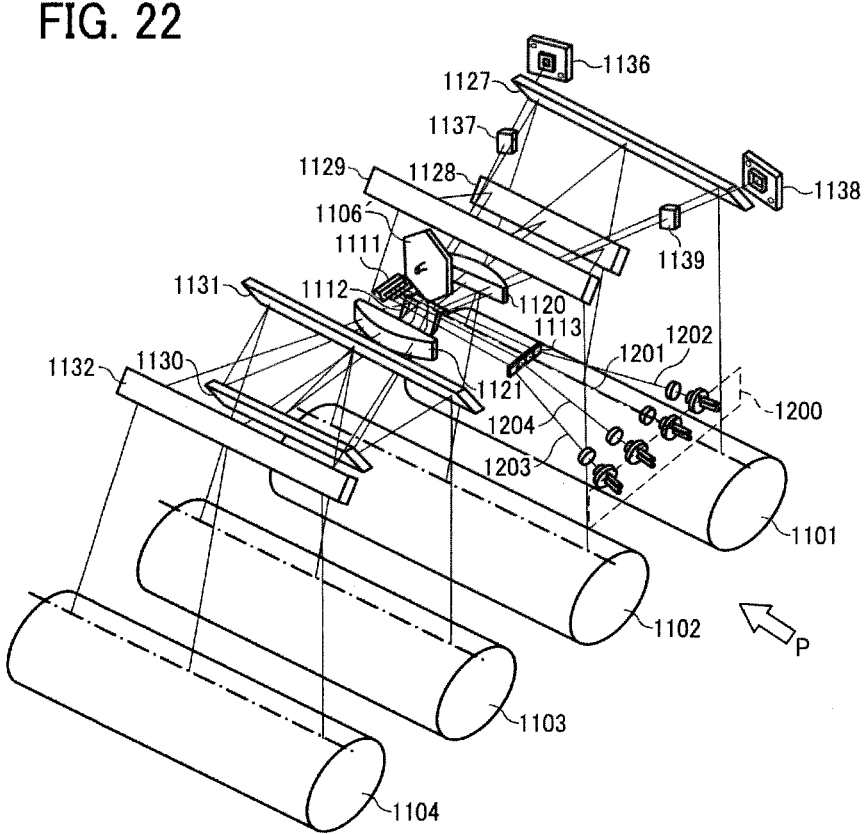
FIG. 22 is a perspective view of a configuration of an optical scanning device according to a second embodiment (2)
Figure 23:
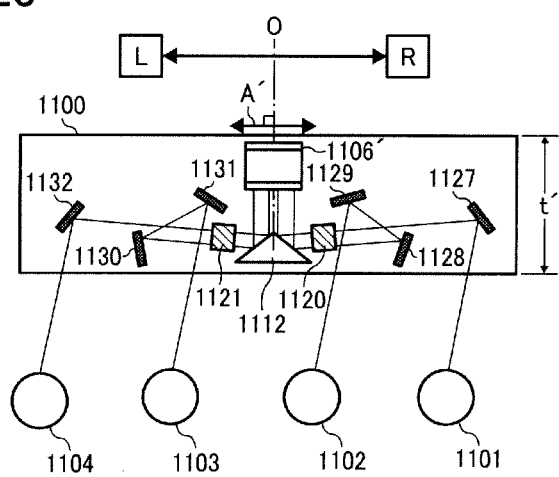
FIG. 23 is an optical path diagram representing the downstream of the deflector in FIG. 22.

FIG. 22 is a perspective view of an optical scanning device using a polygon mirror 1106' instead of the micromirror. An optical path diagram representing the downstream of a deflector and viewed from an observation point P in FIG. 22 is shown in FIG. 23. A relation between a rotation axis A' of the polygon mirror 1106' and a scanning plane of each of the beams 1201 to 1204, a relation in the separation of the beams 1201 to 1204, and a relation between first scanning lenses 1120 and 1121 and the beams 1201 to 1204 are arranged in the same manner as these of the previously described embodiment.

As represented in this example, even if the optical deflector is replaced with the polygon mirror, the effects in the aspects of the invention explained in the first embodiment can be obtained. That is, there can be achieved the optical scanning device capable of stable optical characteristics, and being suitable for a smaller size than that of the conventional polygon mirror optical system.

Second Embodiment (3)

Figure 24:
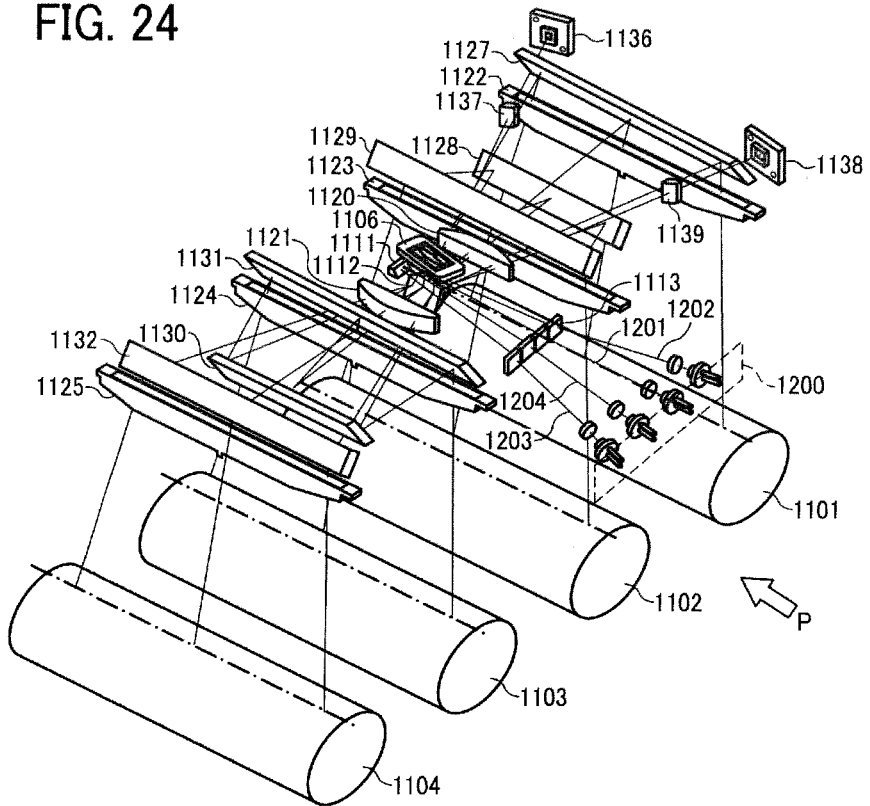
FIG. 24 is a perspective view of a configuration of an optical scanning device according to a second embodiment (3)
Figure 25:
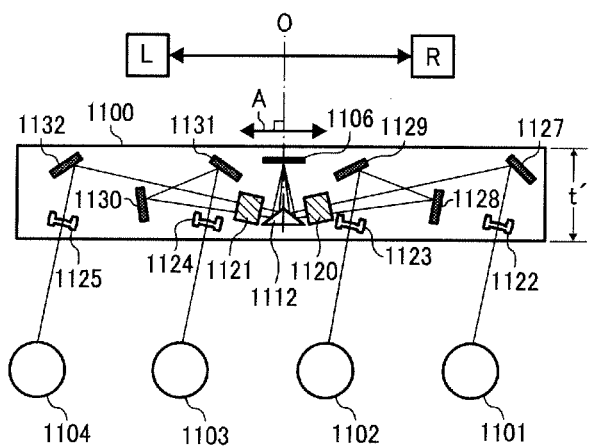
FIG. 25 is an optical path diagram representing the downstream of the deflector in FIG. 24.

FIG. 24 is a perspective view of an optical scanning device in which an oblique incidence angle of light on the micromirror 1106 (an incidence angle in the rotation axis direction A of the micromirror 1106) is made finite and which is further provided with second scanning lenses 1122 to 1125 based on the configuration of the second embodiment (1). An optical path diagram representing the downstream of a deflector and viewed from an observation point P in FIG. 24 is shown in FIG. 25. The relation between the rotation axis A of the micromirror 1106 and the separation of the beams 1201 to 1204 are arranged in the same manner as these of the previously described embodiment. There is adopted a method of widening oblique incidence angles of the beams 1201 to 1204 by the cylindrical lens group 1113, however, if there is any extra space in the layout of the light source units and if there is no problem such as interference even if the oblique incidence angles are kept as they are, a configuration of not changing the oblique incidence angles by the cylindrical lens group 1113 may be adopted.

By causing the beams to enter the micromirror 1106 while providing the oblique incidence angles in this way, the reflective surface of the micromirror 1106 can be made small, and effects such as a speed-up of the scanning speed, an increase in a scanning amplitude, and reduction in deformation of the reflective surface during driving can be preferably achieved. Even when the polygon mirror is used for the optical deflector, adverse effects such as noise, heat generation, oscillation produced when the polygon mirror is made to rotate can be reduced.

Scanning Plane

A relationship between scanning planes of the beams 1201 to 1204 will be explained below.

Figure 26A:
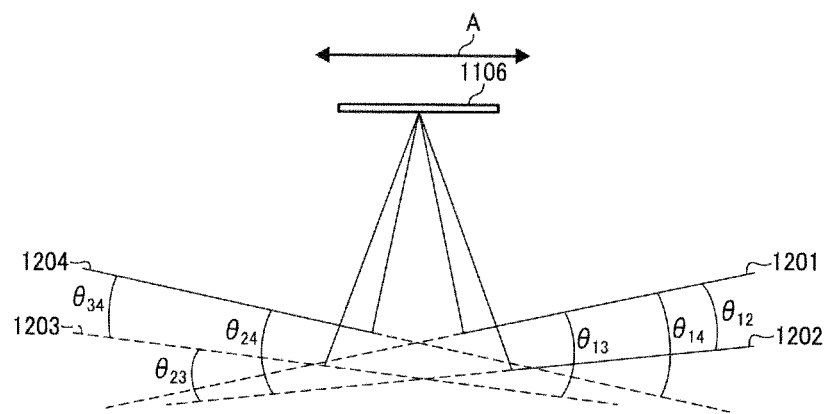
FIGS. 26A and 26B are explanatory diagrams of beams separated by a separation mirror.

FIG. 26A represents the beams deflected by the micromirror 1106 for scanning and separated by the separation mirror 1112 in FIG. 25. Here, to avoid the figure from becoming complicated, the separation mirror 1112 is omitted, and only the way that the beams 1201 to 1204 are reflected by the separation mirror 1112 is shown therein.

Each plane on which each of the beams 1201 to 1204 travels right after being reflected by the separation mirror 1112 is defined as a scanning plane. Angles (acute angle side), formed by the respective scanning planes, in the sub-scanning direction perpendicular to the scanning direction is defined as follows.

Angle formed by the scanning plane of the beam 1201 and the scanning plane of the beam 1202: $\theta_{12}$ Angle formed by the scanning plane of the beam 1201 and the scanning plane of the beam 1203: $\theta_{13}$ Angle formed by the scanning plane of the beam 1201 and the scanning plane of the beam 1204: $\theta_{14}$ Angle formed by the scanning plane of the beam 1202 and the scanning plane of the beam 1203: $\theta_{23}$ Angle formed by the scanning plane of the beam 1202 and the scanning plane of the beam 1204: $\theta_{24}$ Angle formed by the scanning plane of the beam 1203 and the scanning plane of the beam 1204: $\theta_{34}$ In the present embodiment, an angle closest to the right angle (maximum angle) among these angles is $\theta_{14}$.

Figure 26B:
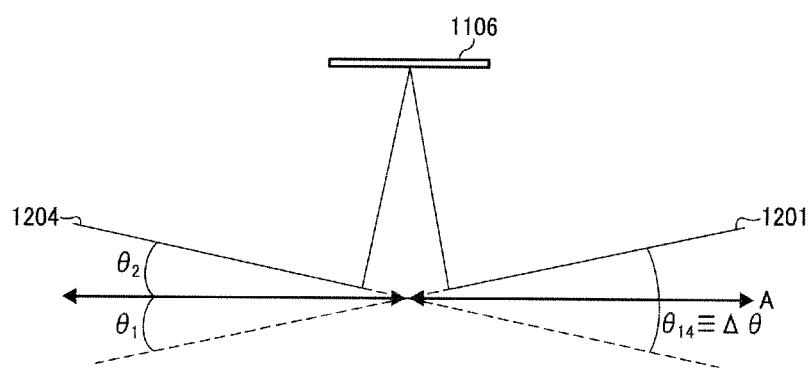

FIG. 26B focuses on only the scanning planes of the beam 1201 and beam 1204 which are two planes forming the angle $\theta_{14}$. Here, $\theta_{14}$ is defined as $\Delta\theta$; an angle formed by the scanning plane of the beam 1201 and a plane including the rotation axis A of the micromirror 1106: $\theta_1$; and an angle formed by the scanning plane of the beam 1204 and the plane including the rotation axis A of the micromirror 1106: $\theta_2$. The present embodiment is configured so as to satisfy a fourth expression as follows.

$$\Delta\theta = \theta_1 + \theta_2$$

By satisfying this condition, also in the oblique incident optical system, an arrangement of light beams is made easier, and flexibility of the layout is thereby increased. Moreover, separating a plurality of light fluxes on the separation mirror 1112 can be make easy, an increase in an incidence angle of a beam on the optical deflector in the sub-scanning direction required for separation is suppressed, and thus it is possible to provide the optical scanning device capable of maintaining stable optical characteristics.

Incidentally, the optical scanning device explained in the second embodiment can be installed in the image forming apparatus shown in FIG. 6.

According to the present invention, it is possible to make full use of the advantages that the thickness of the deflecting unit such as the oscillating mirror in the normal direction is thin. Cost reduction and size reduction can thereby be achieved, which can contribute to size reduction of the image forming apparatus.

Furthermore, according to the present invention, the light collecting unit may be molded integrally so that all the plurality of beams pass therethrough, which allows cost reduction due to reduction in the number of components and assembling processes to be achieved at a time, so that simplification thereof can be achieved, and a positional relationship between the light collecting unit and each of the light beams can be precisely aligned. When the light collecting unit is separately disposed, a positioning member and a fixing member are required for each of them, an error of working accuracy of a discrete component is accumulated, and positioning adjustment becomes complicated.

The light source units for the respective colors are integrally supported by the support member, and are assembled in the housing in a state in which an arrangement accuracy is kept between the light source units for the respective colors. Thus, productivity is improved, and a low-cost optical scanning device can be achieved.

Moreover, according to the present invention, the light beams may be bent at the same angle θa as shown in FIG. 8 (each angle formed by an incidence optical axis of the light beam from the light source and an output optical axis thereof from the cylindrical lens to the reflective mirror). Thereby, in an optical system on a side of the light source with respect to the reflective surface of the deflecting unit, it is possible to configure that the optical elements and the layouts thereof have the same structure, which allows reduction in design time, reduction in cost of components such as the optical elements, adjustment to make deviation between the optical characteristics of light beams very small, and formation of more stable images.

Furthermore, according to the present invention, a pair of the adjacent light collecting units may be configured to bend a corresponding pair of light beams at the same angle, and thus, the light beams can be appropriately separated by planes of the light collecting unit having refracting power, while the light beams can be appropriately arranged at desired positions for the optical elements. When an oblique incidence angles are set to be the same between the pair of light beams, the design layouts and the components having the same structure can be employed, which allows reduction in design time, reduction in manufacturing cost of the components, reduction in time required for adjustment of angles of the optical elements, and improvement of productivity, and thus a low-cost optical scanning device can be achieved.

Moreover, according to the present invention, a diffraction lens may be used in the light collecting unit. By forming a diffraction grating on the surface of the light collecting unit, the light beams can be bent at appropriate angles to be separated from each other, so that arrangement of the light source units is facilitated. By forming diffraction grating patterns while changing their structures depending on respective separation angles required for different light beams, the light beams can be appropriately separated from each other. In addition, by manufacturing the diffraction grating through photolithography technique or the like, it becomes easier to make the light collecting unit thinner and to perform mass-production thereof.

Furthermore, according to the present invention, there may be provided the support member that integrally supports the light source units, the positioning unit for the support member may be provided on the light collecting unit and the light source units may be integrally fixed to the support member. Thereby, in the housing of the optical scanning device, the light source units and the light collecting unit can be laid out at appropriate positions, reliable positioning of a relative arrangement among each of the light source units, the reflective mirror of the deflecting unit, and the ridge line where the reflective surfaces of the separation mirror intersect can be performed. Thus, after the beams are separated by the separation mirror, the scanning trajectory on each of the surfaces to be scanned can be maintained to be parallel to each other, accuracy of superimposition of the colors is improved, and high-quality image can thereby be formed.

Moreover, according to the present invention, a compact image forming apparatus with low cost can be achieved.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. An optical scanning device comprising:
   a plurality of light source units modulated by image information for respective colors;
   a coupling unit that couples a light beam emitted from each of the plurality of light source units;
   a light collecting unit that collects the plurality of light beams coupled;
   a deflecting unit that includes a rotatably supported movable mirror and collectively scans the light beams emitted from the light source units; and
   a plurality of imaging units that images the light beams scanned by the deflecting unit on image carriers for the respective colors, wherein
   the optical scanning device is configured to form a plurality of images for the respective colors and used in an image forming apparatus in which the image carriers for the respective colors are arranged within a same plane,
   the deflecting unit is disposed so that the movable mirror faces the plane where the image carriers are arranged,
   the plurality of light source units are disposed so that main light fluxes of the light beams emitted from the plurality of light source units form predetermined angles with each other in a plane parallel to the plane where the image carriers are arranged,
   the optical scanning device further comprises
   an incidence mirror that is interposed between a reflecting surface of the movable mirror and at least a portion of at least one of the image carriers and bends at least a portion of the light beams emitted from the plurality of light source units to direct said portion of the light beams towards the reflecting surface of the movable mirror and away from the image carriers; and
   a separation mirror that separates the plurality of light beams scanned by the movable mirror into two opposite directions with respect to a cross-section including a surface normal of the movable mirror and perpendicular to a rotation axis of the movable mirror, and
   the light collecting unit collects the light beams so that output optical axes of the light beams corresponding to the light source units intersect at a surface of the movable mirror of the deflecting unit, for scanning the image carriers for the respective colors with the light beams.

2. The optical scanning device according to claim 1, wherein the light collecting unit bends at least one light beam in a direction in which any one of pairs of adjacent ones of the light beams is separated.

3. The optical scanning device according to claim 1, wherein the light collecting unit is molded integrally so that all the plurality of light beams pass therethrough.

4. The optical scanning device according to claim 1, wherein all the plurality of light beams are bent at a same angle by the light collecting unit.

5. The optical scanning device according to claim 1 wherein a pair of adjacent ones of a plurality of collecting units bend a corresponding pair of the light beams at a same angle.

6. The optical scanning device according to claim 1, wherein a diffraction lens is used in the light collecting unit.

7. The optical scanning device according to claim 1, the light collecting unit collects the light beams so that output optical axes of the light beams corresponding to the light source units intersect with each other at the surface of the movable mirror of the deflecting unit, for scanning the image carriers for the respective colors with the light beams.

8. An image forming apparatus using a optical scanning device comprising:
a plurality of light source units modulated by image information for respective colors;
a coupling unit that couples a light beam emitted from each of the plurality of light source units;
a light collecting unit that collects the plurality of light beams coupled;
a deflecting unit that includes a rotatably supported movable mirror and collectively scans the light beams emitted from the light source units; and
a plurality of imaging units that images the light beams scanned by the deflecting unit on image carriers for the respective colors, wherein
the optical scanning device is configured to form a plurality of images for the respective colors and used in an image forming apparatus in which the image carriers for the respective colors are arranged within a same plane,
the deflecting unit is disposed so that the movable mirror faces the plane where the image carriers are arranged,
the plurality of light source units are disposed so that main light fluxes of the light beams emitted from the plurality of light source units form predetermined angles with each other in a plane parallel to the plane where the image carriers are arranged,
the optical scanning device further comprises
an incidence mirror that is interposed between a reflecting surface of the movable mirror and at least a portion of at least one of the image carriers and bends at least a portion of the light beams emitted from the plurality of light source units to direct said portion of the light beams towards the reflecting surface of the movable mirror and away from the image carriers; and
a separation mirror that separates the plurality of light beams scanned by the movable mirror into two opposite directions with respect to a cross-section including a surface normal of the movable mirror and perpendicular to a rotation axis of the movable mirror, and
the light collecting unit collects the light beams so that output optical axes of the light beams corresponding to the light source units intersect at a surface of the movable mirror of the deflecting unit, for scanning the image carriers for the respective colors with the light beams.

9. An optical scanning device comprising:
a plurality of light sources that emits light fluxes scanning a plurality of surfaces to be scanned;
an optical deflector unit that deflects the light fluxes emitted from the plurality of light sources on a same surface for scanning,
the optical deflector unit including a rotatably supported movable mirror and an incidence mirror that is interposed below a reflecting surface of the movable mirror and at least a portion of at least one of the surfaces to be scanned;
a separation unit that separates the plurality of light fluxes into a first set of light fluxes and a second set of light fluxes; and
an imaging unit that images the light fluxes deflected for scanning by the optical deflector, wherein
the incidence mirror deflects at least a portion of the light fluxes towards the reflecting surface of the movable mirror and away from the surfaces to be scanned, and
all the light fluxes separated by the separation unit are reflected so as to come close to a plane that is parallel to directions in which the light fluxes are scanned on the surfaces to be scanned, and includes a rotation axis of the optical deflector.

10. The optical scanning device according to claim 9, wherein
the separation unit includes two reflective surfaces, and
an angle formed by the two reflective surfaces and pointing towards the optical deflector is made obtuse.

11. The optical scanning device according to claim 9, wherein an angle formed by an incident light and a reflected light of each of the plurality of light fluxes in the separation unit in a direction parallel to the rotation axis of the optical deflector is made acute.

12. The optical scanning device according to claim 9, wherein the separation unit that separates the plurality of light fluxes into the first set of light fluxes and the second set of light fluxes is disposed at an upstream side of the imaging unit.

13. An optical scanning device comprising:
a plurality of light sources that emits light fluxes scanning a plurality of surfaces to be scanned;
an optical deflector that deflects the light fluxes emitted from the plurality of light sources on a same surface for scanning;
a separation unit that separates the plurality of light fluxes into a first set of light fluxes and a second set of light fluxes; and
an imaging unit that images the light fluxes deflected for scanning by the optical deflector, wherein
all the light fluxes separated by the separation unit are reflected so as to come close to a plane that is parallel to directions in which the light fluxes are scanned on the surfaces to be scanned, and includes a rotation axis of the optical deflector, wherein
the light fluxes emitted from the plurality of light sources are incident on the optical deflector in parallel to a plane perpendicular to the rotation axis of the optical deflector,
the first set of light fluxes are parallel to each other and the second set of light fluxes are parallel to each other,
when an angle at an acute angle side, formed by a plurality of scanning planes scanned by the first set of light fluxes and the second set of light fluxes, is set as $\Delta\theta_p$, angles at acute angle sides formed by a first plane and a second plane, which are two planes forming the angle of $\Delta\theta_p$, and a plane including the rotation axis of the optical deflector are set as $\theta_1 p$ and $\theta_{2p}$, $$\Delta\theta_p = \theta_{1p} + \theta_{2p}$$

is satisfied.

14. The optical scanning device according to claim 13, wherein, viewed in a direction of the rotation axis of the optical deflector on a deflecting surface of the optical deflector, when a distance between the first set of light fluxes is set as $\Delta Z_1$, a distance between the second set of light fluxes is set as $\Delta Z_2$, and a distance between adjacent light fluxes composed of one of the first set of light fluxes and one of the second set of light fluxes is set as $\Delta Z$, $$\Delta Z < \Delta Z_1$$

$$\Delta Z < \Delta Z_2$$

are satisfied.

15. The optical scanning device according to claim 14, wherein, viewed in a direction of the rotation axis of the optical deflector, when a distance between a first set of light-emitting points corresponding to the first set of light fluxes is set as $\Delta S_1$, a distance between a second set of light-emitting points corresponding to the second set of light fluxes is set as $\Delta S_2$, and a distance between adjacent light-emitting points composed of one of the first set of light fluxes and one of the second set of light fluxes is set as $\Delta S$, $$\Delta S < \Delta S_1$$

$$\Delta S < \Delta S_2$$

are satisfied.

16. The optical scanning device according to claim 14, wherein at least one anamorphic optical element including a plurality of effective surfaces provided for each of the plurality of light fluxes, is provided at an upstream side of the optical deflector, and at least one surface of the plurality of effective surfaces is inclined differently to another surface of the plurality of effective surfaces with respect to the direction of the rotation axis of the optical deflector.

17. The optical scanning device according to claim 13, wherein the imaging unit includes a shared imaging unit that has a shared optical surface through which one set of the plurality of light fluxes that are reflected by the separation unit to a same side of a plane perpendicular to the rotation axis of the optical deflector, and the shared imaging unit is parallel to the one set of light fluxes.

18. The optical scanning device according to claim 13, wherein the light fluxes emitted from the plurality of light sources are incident at a predetermined angle to a plane perpendicular to the rotation axis of the optical deflector, and when an acute angle closest to a right angle, formed by a plurality of scanning planes scanned by the plurality of light fluxes separated by the separation unit is set as $\Delta\theta$, and angles at acute angle sides formed by a first plane and a second plane, which are two planes forming the angle of $\Delta\theta$, and a plane including the rotation axis of the optical deflector are set as $\theta_1$ and $\theta_2$, respectively, $$\Delta\theta = \theta_1 + \theta_2$$

is satisfied.

19. The optical scanning device according to claim 18, wherein at least one anamorphic optical element including a plurality of effective surfaces provided for each of the plurality of light fluxes, is provided at an upstream side of the optical deflector, and at least one surface of the plurality of effective surfaces is inclined differently to another surface of the plurality of effective surfaces with respect to the direction of the rotation axis of the optical deflector.

* * * * *